United States Patent [19]
Song et al.

[11] Patent Number: 6,046,721
[45] Date of Patent: Apr. 4, 2000

[54] MULTI-FUNCTIONAL MONITOR

[75] Inventors: Tao Song; Bang Xin Zhang, both of Shenzhen, China; Bo Xu, 11270 Crestridge Ct., Alta Loma, Calif. 91737

[73] Assignees: Bo Xu; Hong Zhou; KSAI Electronics, all of Alta Loma, Calif.

[21] Appl. No.: 08/959,814

[22] Filed: Oct. 29, 1997

[51] Int. Cl.$^7$ ...................................... G09G 5/00
[52] U.S. Cl. ........................... 345/132; 345/13; 348/552; 348/553; 348/554
[58] Field of Search ..................................... 348/552, 553, 348/554, 510, 521; 345/3, 4, 5, 132, 13, 10, 11, 12

[56] References Cited

U.S. PATENT DOCUMENTS 5,610,663  3/1997  Nan .......................................... 348/554

*Primary Examiner*—Ba Huynh
*Attorney, Agent, or Firm*—Raymond Y. Chan; David and Raymond

[57] ABSTRACT

A multi-functional monitor includes a plurality of availability of mature circuits, including a TV signal processing circuit, a signal amplifying circuit, a H/V deflection circuit, a CRT display tube, an AV switching circuit, a video and audio output/input circuit, and a FM radio receiver. The multi-functional monitor further includes the following newly designed circuits to incorporate with the above mature circuits, including a switcher A, a switcher B, a micro controller unit, a TV flyback pulse simulating circuit, and an integrated control circuit. The multi-functional monitor possesses the functions of being used either as a computer color CRT monitor or at the same time as a multi system color television. Apart from these, there are other additional functions of its such as that of Karaoke and AV output/input and FM radio receiver. It does not need for the external speaker and the input of AV signals to operate the computer in multi-media way. It is particularly convenient for the interactive mutual-act data network which is composed of computers, broadcast televisions and telecommunications.

40 Claims, 14 Drawing Sheets

Subprogram MOD1:

Subprogram MOD4:

Subprogram MOD5:

MULTI-FUNCTIONAL MONITOR

FIELD OF THE PRESENT INVENTION

The present invention relates to a computer monitor, and more particularly to a multi-functional monitor which is an interactive multimedia monitor that can also be used as a television and FM radio receiver.

BACKGROUND OF THE PRESENT INVENTION

It is well known that a computer monitor can not display pictures shown on television by directly receiving the signals of television. A technology converting a VGA signals to TV signals and using television as a monitor (TV monitor) has a big drawback that, the resolution of the TV CRT is not high enough to show the text mode or a quality picture as a regular monitor. Although the present multimedia technology, to certain extent, has built up a bridge of mutual communications between the monitor and television, for instance, by plugging television card, sound card or video card, etc. into the extension slot of the computer in order to enable the computer monitor to receive television signals and to display television picture. Alternatively, although the conventional television is merely able to display the audio frequency and the video frequency output by computer, the displaying signals, once being processed by that way, are supposed to decline in such a way as to have a bad influence on the resolution of the picture. In addition, to plug in a television card to a conventional computer may cause a lot of compatibility's problems. In other words, the conventional plug and play computer monitor itself does not has the ability of receiving television signals and displaying television pictures.

Furthermore, the technical means mentioned above are not too well convenient in using in most occasions, such as that of the interactive mutual-act data network which is composed by the computers, broadcast televisions and telecommunications. Therefore, there arises a significant need to develop a multi-functional monitor, such as an interactive multimedia monitor that can characterize an independent and compatible feature in receiving and displaying the computer, television and even radio signals.

SUMMARY OF THE PRESENT INVENTION

It is a main object of the present invention to provide a multi-functional monitor to improve the prevailing technique mentioned above, that is an interactive multimedia monitor which is capable of receiving and displaying both the computer signals and television (TV) signals.

It is another object of the present invention to provide a multi-functional monitor which is capable of receiving and displaying the audio/video signals and even the FM radio signals.

Accordingly, in order to achieve the above objectives of the present invention, the circuits of television and the displaying circuits of computer have been recombined, rearranged, and reformed to a multi-functional monitor of the present invention with an addition of a group of circuits for playing the role of signal transfer and switch. The technology which have been adopted in the present invention are illustrated as follows:

1. There have utilized micro-processors to control the procedure of switching between television display and computer display, including the switching of signal channel and that of the horizontal and vertical sync signal. The amplifying circuit and horizontal and vertical deflection circuit have been employed in mixed means, either to simplify the circuit or to reduce the cost of production.

2. Regarding the television signal color decoding, a time delay and spreading circuit is utilized to simulate the flyback pulse of television, so as to assure the accuracy of the color decoding and at the same time enabling both of them to share the flyback transformer of the monitor. Accordingly, the great difficulties of design and stability caused by the considerably great difference between the television flyback transformer (TV FBT) and the computer flyback transformer (computer FBT) can thus be solved.

3. By incorporating a micro controller unit (MCU) with the television single control piece (TV SCP) enables to achieve the accurate options among various kinds of audio-video AV terminal and television receiving systems. That is, when operating in the mode of computer display, audio is automatically converted into an exterior input situation, cutting television signals off. Color mode is to be fixed in the position of AUTO and MANUAL when it is working in the mode of TV display. The former, according to the input signals of TV, is to automatically decide the mode of color decoding, and the later is to fix artificially the mode of color decoding, so that the PAL-60 or NTSC-4.43 which are the signal modes of non-broadcasting color TV can be received.

4. By equipping the micro controller unit (MCU) enables the automatic adjustment of each parameter of the horizontal and vertical deflection circuits either under the computer mode or the TV mode.

DETAILED DESCRIPTION OF THE PREFERRED EMBODIMENT

Figure 1:
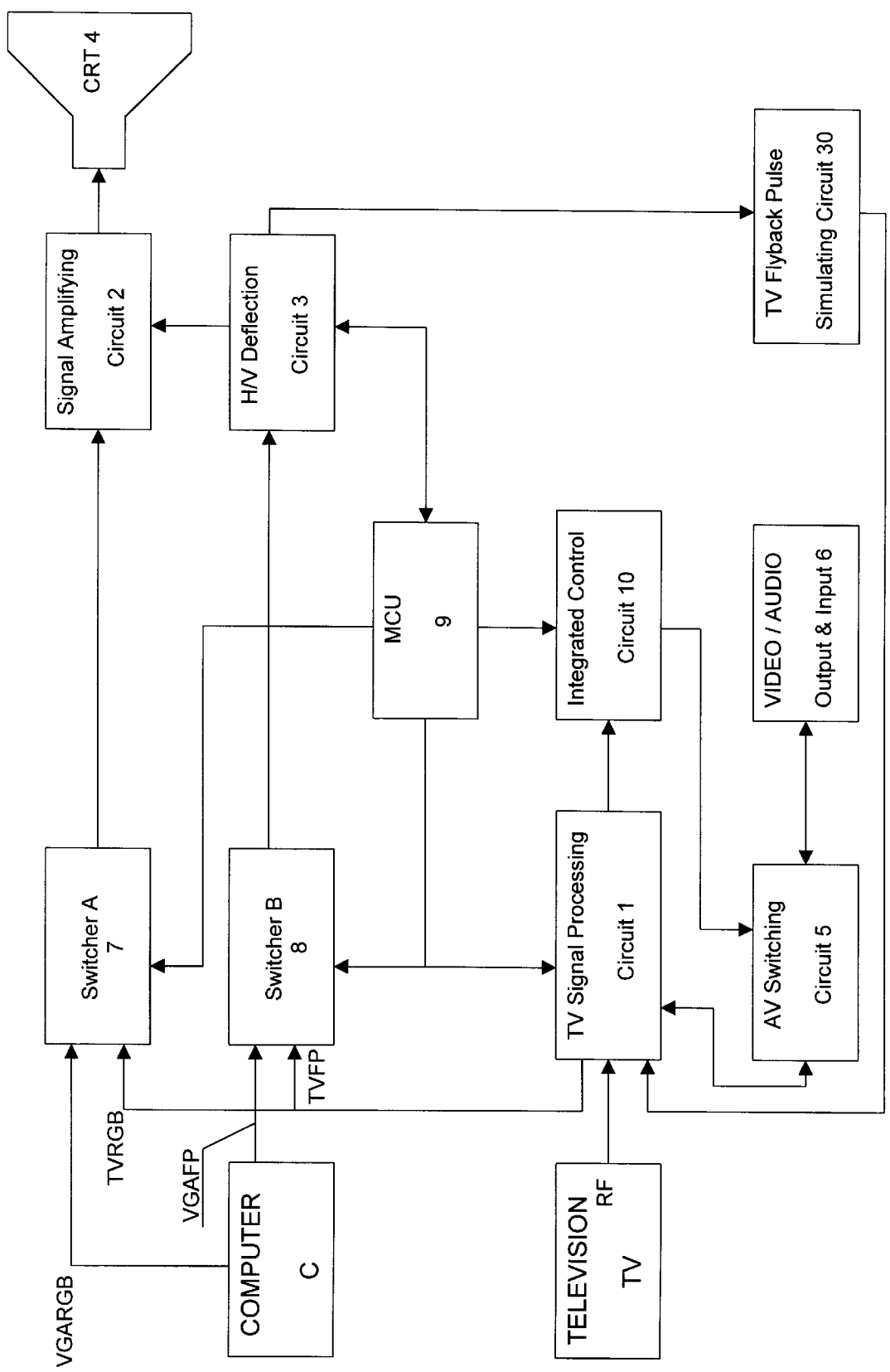
FIG. 1 is a general logical diagram of a multi-functional monitor in accordance with a preferred embodiment of the present invention.

Referring to FIG. 1, a multi-functional monitor according to a preferred embodiment of the present invention comprises six mature circuits including a TV signal processing circuit 1, a signal amplifying circuit 2, a H/V deflection circuit 3, a CRT display tube 4, an AV switching circuit 5, and a video-audio output/input circuit 6. The multi-functional monitor of the present invention further comprises a switcher A 7 for switching red, green and blue (RGB) signal, a switcher B 8 for switching horizontal and vertical sync signal and horizontal driving pulse signal, a micro controller unit (MCU) 9 for switching control of computer display and television display, a TV flyback pulse simulating circuit 30, and an integrated control circuit 10.

Some signal input terminals of the switcher A 7, the switcher B 8, the TV signal processing circuit 1, and the integrated control circuit 10 are connected with the corresponding outputs of the MCU 9. The H/V deflection circuit 3 is bi-directionally connected with the MCU 9 so that the electrical signal can be mutually transferred therebetween.

Another two signal input terminals of the switcher A 7 for the RGB signal of television TV (TV RGB) and the RGB signal of computer C (VGA RGB) are respectively connected to the TV signal processing circuit 1 and a RGB signal output terminal of computer. A signal output terminal of the switcher A 7 is connected to an input terminal of the signal amplifying circuit 2.

Another two signal input terminals of the switcher B 8, for the horizontal and vertical sync signal and the horizontal driving pulse signal of computer C (VGAFP) and the horizontal and vertical sync signal and the horizontal driving pulse signal of television TV (TVFP), are respectively connected with a signal output terminal of the TV signal processing circuit 1 and an output terminal of the horizontal and vertical sync signal of the computer. A signal output terminal of the switcher B is connected to an input terminal of the H/V deflection circuit 3.

Two output terminals of the H/V deflection circuit 3 are respectively connected to an input terminal of the signal amplifying circuit 2 and an input terminal of the TV flyback pulse simulating circuit 30. An output terminal of the signal amplifying circuit 2 is connected with the CRT display tube 4. The connection between the TV signal processing circuit 1 and the AV switching circuit 5 and the connection between the AV switching circuit 5 and the video-audio output and input circuit 6 are bi-directional, so as to enable signals transferring bi-directionally therebetween.

Another two input terminals of the TV signal processing circuit 1 are respectively connected to the input terminals of the RF signal output of television TV and the output terminal of the TV flyback pulse simulating circuit 30. Two signal input terminals of the integrated control circuit 10 are respectively connected to an output terminal of the TV signal processing circuit 1 and an output terminal of the MCU 9. An signal output terminal of the integrated control circuit 10 is connected to an input terminal of the AV switching circuit 5.

Figure 2A:
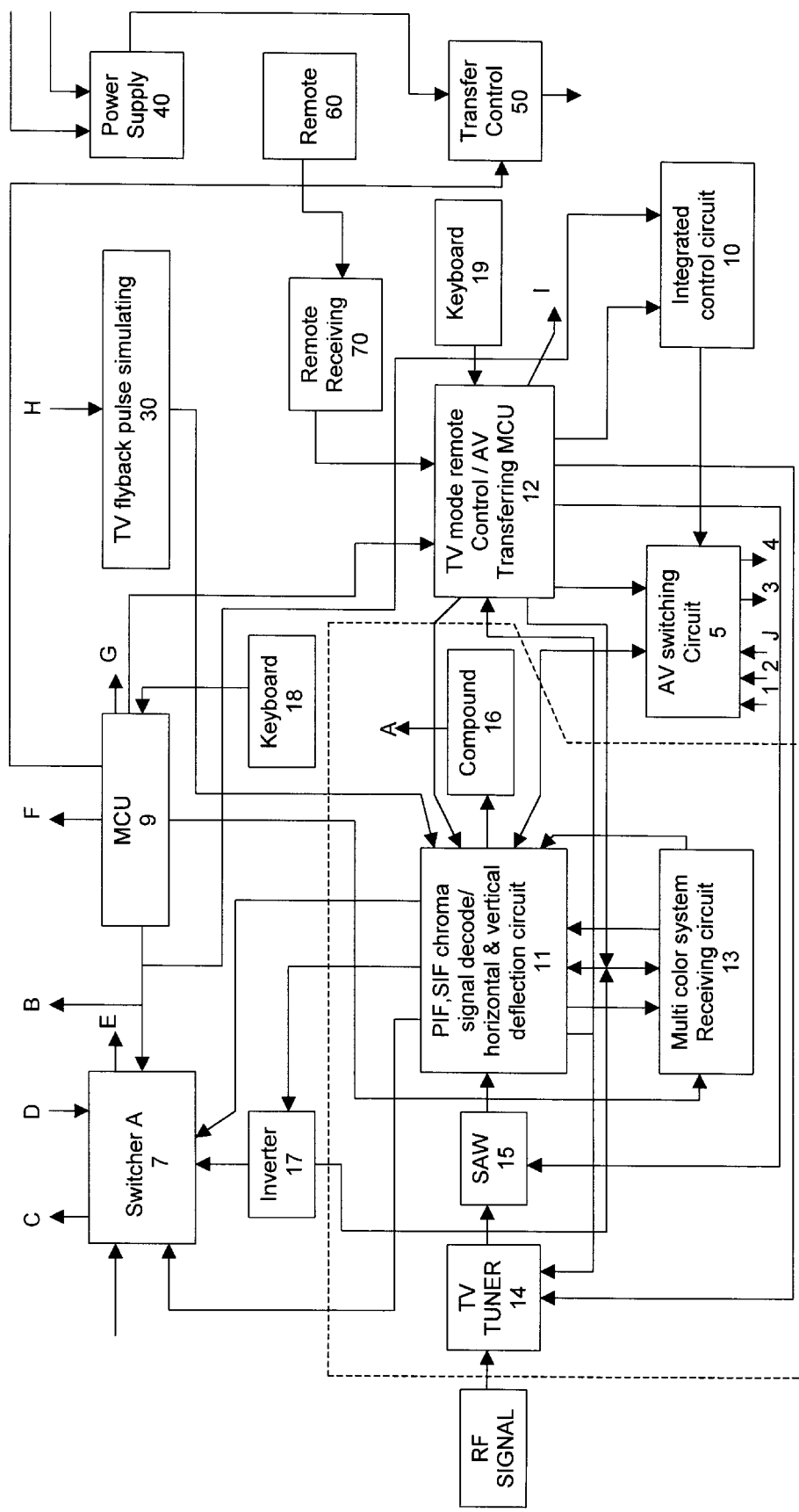
FIGS. 2A to 2C illustrate a set of block diagrams of the multi-functional monitor according to the above preferred embodiment of the present invention.
Figure 2B:
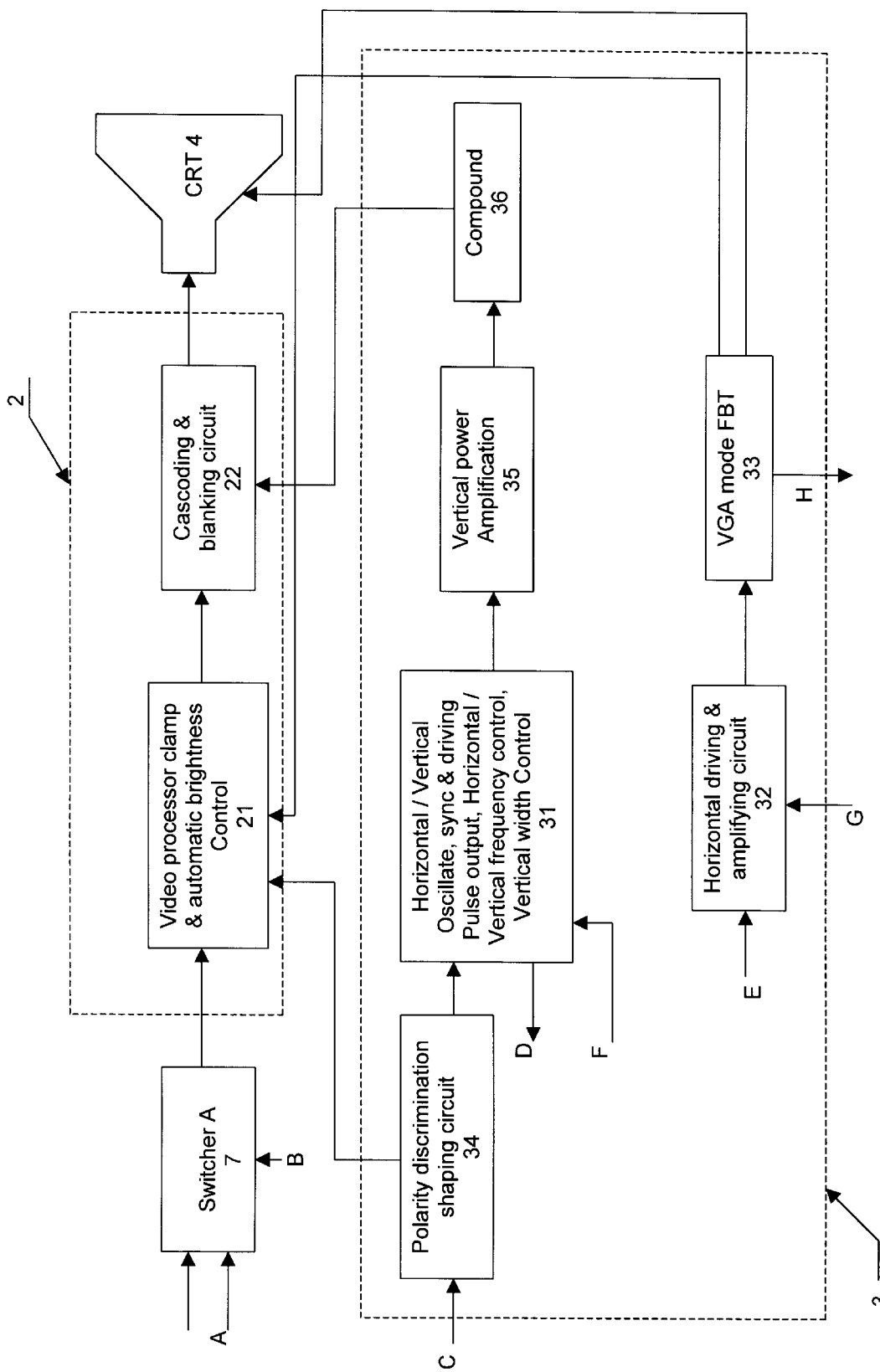
Figure 2C:
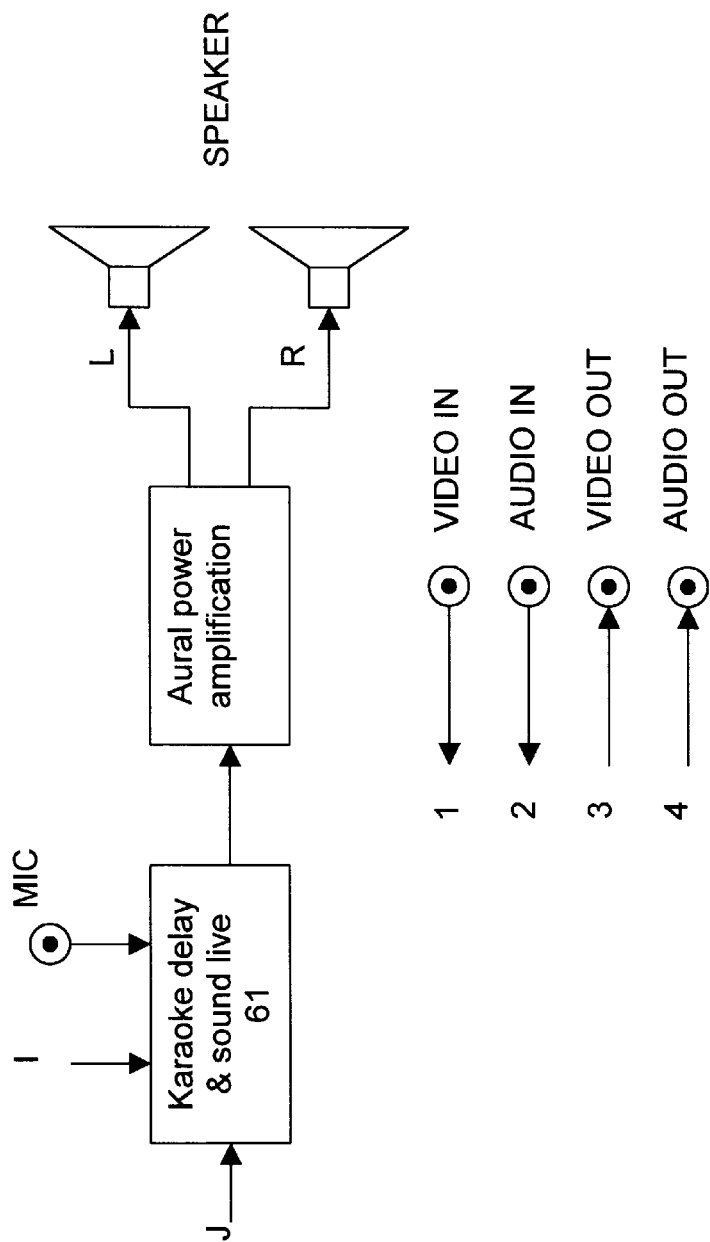

FIG. 2 is divided into three related figures, FIGS. 2A, 2B and 2C, for illustrating an entire block diagram of the multi-functional monitor of the present invention, wherein FIG. 2B can be linked up with the FIG. 2A through eight terminal pads A, B, C, D, E, F, G, and H and FIG. 2C can be linked up with FIG. 2A through six terminal pads 1, 2, 3, 4, I, and J.

As shown in FIG. 2B, the signal amplifying circuit 2 comprises a video processor clamp and automatic brightness control 21 connected with the switcher A 7 and a cascode and blanking circuit 22 connected between the video processor clamp and automatic brightness control 21 and the CRT display tube 4. The video processor clamp and automatic brightness control 21 and the cascode and blanking circuit 22 are utilized by both computer (VGA) display mode and television (TV) display mode, while only the sources of signals vary. The RGB signal of the computer (VGA RGB) and the RGB signal of the television (TV RGB) exercise transferring and switching through the switcher A 7 under the control of MCU 9. Three ways of selected signal achieve the clamp, automatic brightness control and contrast control through the video processor clamp and automatic brightness control 21. The RGB signal after processing by the video processor clamp and automatic brightness control 21 is transferred to the cascode and blanking circuit 22 for amplification, and that blanking signals meanwhile are added in at the time of horizontal/vertical retrace. The amplified red, green and blue RGB signal is suitable for displaying through the CRT display tube 4.

The H/V deflection circuit 3 is also utilized and employed by both the computer (VGA) display mode) and the television (TV) display mode. The operation of switching the horizontal and vertical sync signal and the horizontal driving pulse signal of the computer and that of the TV are conducted by the switcher B 8 under the control of MCU 9. The H/V deflection circuit 3 comprises a horizontal and vertical oscillation/synchronize and driving pulse output/horizontal and vertical frequency control/vertical width control circuit 31 (the hereinafter referring to control circuit 31) having an output and an input respectively connected to the switcher B 8 and the MCU 9, a driving and amplifying circuit 32 having two inputs respectively connected to an output of the switcher B 8 and an output of the MCU 9, a computer mode fly back transformer (VGA mode FBT) 33 having an input connected to an output of the driving and amplifying circuit 32 and two outputs respectively connected to an input of the TV flyback pulse simulating circuit 30 and an input of the CRT display tube 4, a polarity discrimination shaping circuit 34 which is connected with the VGA mode FBT 33 having an input connected to an output of the switcher B 8 and two outputs respectively connected to an input of the video processor clamp and automatic brightness control 21 and an input of the video processor clamp and automatic brightness control 21, a power amplifying circuit 35 having an input connected to an output of the control circuit 31, and a composite circuit 36 having an output connected with an input of the cascode and blanking circuit 22 and two inputs respectively connected with an output of the power amplifying circuit 35 and an output of the VGA mode FBT 33.

The horizontal driving pulse signals are received by the driving and amplifying circuit 32 where to acquire the horizontal DY scanning current and various high voltages (speeding voltage, focus voltage, second cathode voltage, etc.). This is done by the coordination of the VGA mode FBT 33. Besides, the horizontal and vertical sync signals enter through the polarity discrimination shaping circuit 34 into the control circuit 31 to complete the horizontal and vertical oscillation, synchronization, horizontal and vertical frequency control vertical width control and output horizontal and vertical driving pulse, of which the horizontal driving pulse shapes the square wave and the vertical driving pulse saw tooth wave. It should be pointed out that it is always invalid that the horizontal driving pulse produced by the control circuit 31 through the switcher B 8 when the system is working in the way of TV display. In other words, the driving pulse which has entered into the horizontal driving/amplifying circuit 32 is produced by the control circuit 31 when the system is working in the way of computer display. In TV display mode, the driving pulse which has entered into the horizontal driving/amplifying circuit 32 is produced by a picture intermediate-frequency signal (PIF), SIF chroma signal decode and horizontal and vertical deflection circuit 11. The vertical driving saw tooth wave produced by the control circuit 31 enters into the vertical power amplifying circuit 35 to acquire vertical deflection current to produce at the same time the flyback pulse which is received by the composite circuit 36 together with the horizontal flyback pulse yielded by the VGA mode FBT to form the composite blanking pulse which is to be dispatched to the cascode and blanking circuit 22.

As shown in FIG. 2A, the TV signal processing circuit 1 comprises the PIF, SIF chroma signal decode and horizontal and vertical deflection circuit 11 (hereinafter referring to deflection circuit 11), a TV mode remote-control/AV switching micro controller unit (MCU) 12 (hereinafter referring to switching MCU 12), a multi color system receiving circuit 13, a TV turner 14, a surface audio wave (SAW) filter 15, and a compound circuit 16 electrically connected.

In the TV signal processing circuit 1, a RF signal from television TV enters the TV turner 14, supplying a secondary RF signal, wherein control signals are provided by the switching MCU 12 and the deflection circuit 11, mainly AFT (automatic frequency tune) and AGC (automatic gain control) band selections. The secondary RF signal is processed by the surface audio wave (SAW) filter 15 to obtain the picture intermediate-frequency signal (PIF). The PAL/NTSC power levels provided by the switching MCU 12 select two modes of difference intermediate-frequency features. The PIF from the SAW filter 15 enters the deflection circuit 11, wherein part of the PIF creates a full TV signal which contains audio signal and is sent to the multi color system receiving circuit 13 that is under the control of PAL-1 and PAL-DK signals from the MCU 9 and PAL/NTSC signals from switching MCU 12 for selecting the different composition of band pass and band gap filters in order to adapt the requirement of various television (TV) modes.

The multi color system receiving circuit 13 finally sends out a non-aural accompanied video frequency signal VIDEO to the AV switching circuit 5. At the same time, the aural accompanied tune signal and the non-aural VIDEO signal return back to the deflection circuit 11 via the switching process exercised by the AV switching circuit 5 for color decoding and sound decoding, in which the aural output from the deflection circuit 11 is dispatched to the AV switching circuit 5 and the coloring decoding provides brightness and chroma signals which are sent to the compound circuit 16 for compounding to form a TV RGB signal sending to the switcher A 7. When the color decoding is processing in the deflection circuit 11, it needs to gate color sync signals, however the width of the horizontal retrace pulse sending from the VGA mode FBT 33 is relatively too small for selecting the group of color sync pulses. Therefore, it is necessary to make the horizontal retrace pulse wider by advancing the leading edge through the TV flyback pulse simulating circuit 30. The horizontal retrace pulse which has been reshaped is sent into the deflection circuit 11.

As shown in FIGS. 2A, 2B and 2C, the AV switching circuit 5 is an audio frequency and video frequency switcher, which has a plurality of inputs for respectively receiving an external VIDEO IN, an external right and left channel AUDIO IN, the VIDEO sending from the multi color system receiving circuit 13, and the left and right audio signal sending from the deflection circuit 11. An output of the AV switching circuit 5 is a clamp output, that is a VIDEO output (VIDEO OUT) and a left and right AUDIO signals output (AUDIO OUT) for use of external devices. Another output of the AV switching circuit 5 which is controlled by the integrated control circuit 10 is connected to a Karaoke delay living circuit 61, as shown in FIGS. 2A and 2C, which is further connected to an audio amplifying circuit 62. When it is operating in the TV display mode, the video frequency and audio frequency sent into the deflection circuit 11 and the Karaoke delay living circuit 61 could either be the external VIDEO IN and AUDIO IN signals or the VIDEO and AUDIO signals sent from the deflection circuit 11 and the multi color system receiving circuit 13. When it is operating in the computer display mode, the AV switching circuit 5 is forced to select the external VIDEO and AUDIO signals (VIDEO IN and AUDIO IN). The control of volume is conveyed in by the switching MCU 12. The Karaoke delay living circuit 61 is considered as the section of Karaoke, which volume of microphone, volume of echo and selection of Karaoke are also conveyed in by the switching MCU 12. Furthermore, there are external microphone and external aural that are conveyed in the AV switching circuit 5. Audio signal which has been processed is divided into two ways, left and right, which are then sent into the audio amplifying circuit 62 for being amplified to drive a left and a right speaker (SPEAKER), as shown in FIG. 2C.

As shown in FIG. 2A, a first keyboard 18 is a keyboard circuit connected to the MCU 9. A second keyboard 19 is another keyboard circuit connected to the switching MCU 12. When the first keyboard 18 or the second keyboard 19 is pressed, the corresponding MCU 9 or switching MCU 12 can be detected and recognized to make appropriate response.

As shown in FIG. 2A, a remote control handset (Remote) 60 where string pulse is formed from infrared remote control signal which has been demodulated by a receiving head (Remote Receiver) 70 and sent into the switching MCU 12 to become the decode of TV SCP for processing corresponding control.

As shown in FIG. 2A, a power supply circuit 40 is a switch stabilized voltage supply, providing an alternative input voltage ranging from 90 to 250 V and 50/60 Hz. Within this voltage range, the power source works normally and provides seven groups of voltage, including 123V, 90V, 56V, 12V, 5V, and 6.3V, wherein the voltage of supplying the H/V deflection circuit 3 and the signal amplifying circuit 2 is either one of 123V, 90V and 56V, that the switching control is processed by a switching control circuit 50 with the control signal furnished by the MCU 9. Practically, to operate in the TV display mode is 56V, and that to operate in the computer display mode is 123V when the horizontal frequency is over 40 Hz, otherwise is 90V.

The switcher A 7, the switch B 8, the MCU 9, the TV flyback pulse simulating circuit 30, and the integrated control circuit 10 are the essential characteristics of the present invention for enabling the multi-functional monitor to receive and display both the computer signals and the TV signals and even the FM signals.

Figure 3:
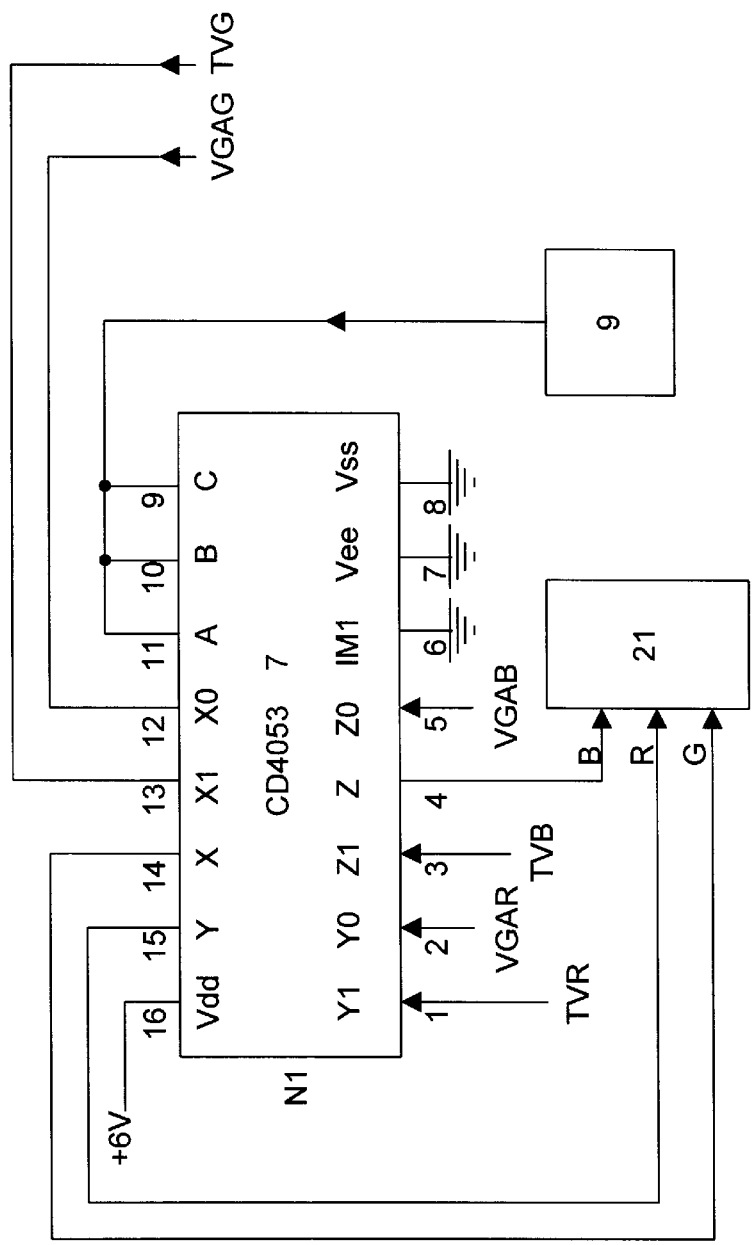
FIG. 3 is a schematic electrical diagram of a switcher A of the multi-functional monitor according to the above preferred embodiment of the present invention.

FIG. 3 illustrates the switcher A 7 which is an analogue triple SPDT chip N1. Outputs of pins 1, 3 and 13 of N1 are considered as the input terminals of TV RGB signals, such as TVR, TVG and TVB. Outputs of pins 2, 5 and 12 are the input terminals of computer RGB signals, such as VGAR, VGAG and VGAB. Outputs of pins 9, 10 and 11 which have joined up in parallel as the input terminals of the control signals VGA are connected with one signal output terminal of the MCU 9. Pins 4, 14 and 15 are the output terminals of the RGB signal of the switcher A 7, which are connected with the input terminals of the video processor clamp and automatic brightness control 21. When the control signal VGA is high in power level (>3.5V), the TVR, TVG and TVB are selected and output from the pins 4, 14 and 15. When the control signal VGA is low in power level (<0.7V), the VGAR, VGAG and VGAB are selected and output from the pins 4, 14 and 15.

Figure 4:
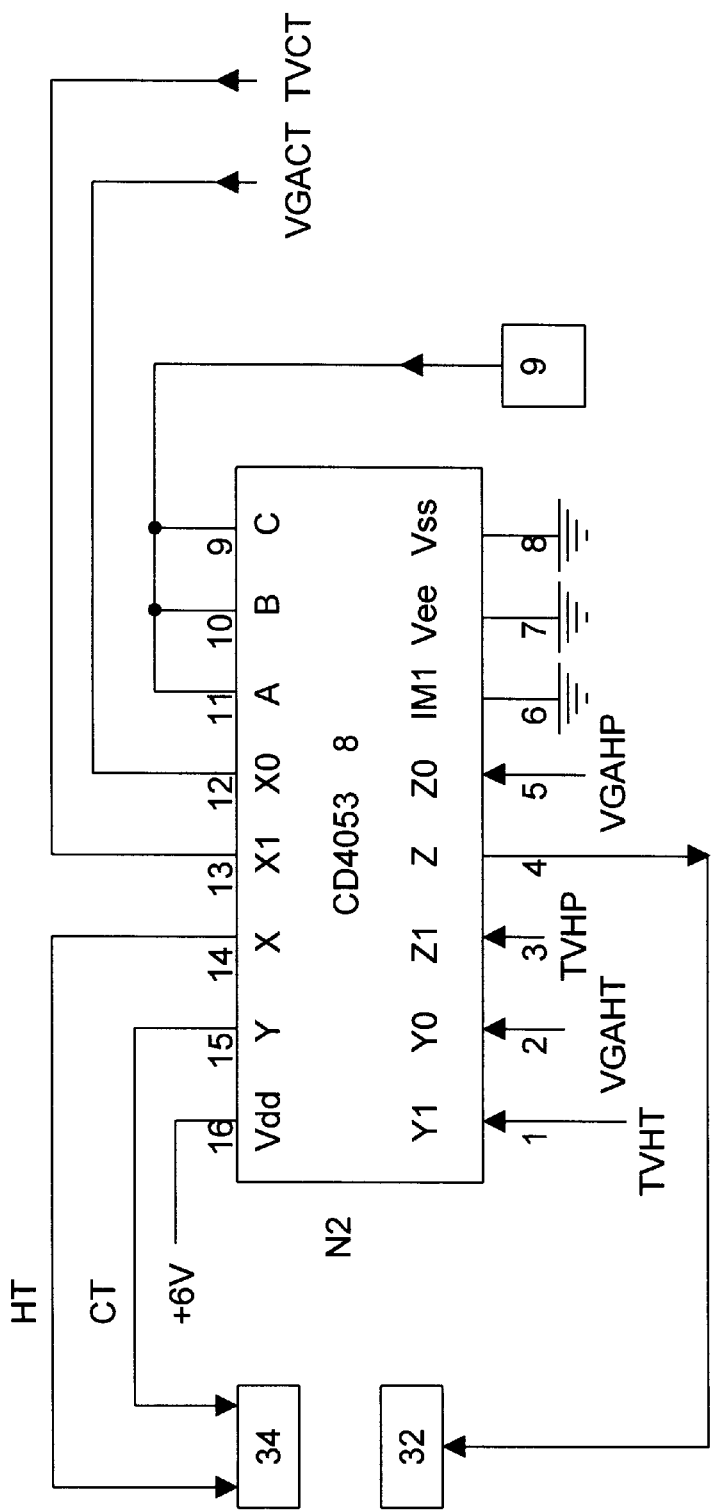
FIG. 4 is a schematic electrical diagram of a switcher B of the multi-functional monitor according to the above preferred embodiment of the present invention.

FIG. 4 illustrates the switcher B 8 which is an analogue triple SPDT chip N2. Outputs of pins 1, 3 and 13 of N2 respectively serve as input terminals of the television's horizontal sync signal TVHT, vertical sync signal TVCT and the horizontal driving pulse signal TVHP. Outputs of pins 2, 5 and 12 respectively serve as input terminals of the computer's horizontal sync signal VGAHT, vertical sync signal VGACT and horizontal driving pulse signal VGAHP. Outputs of pins 9, 10 and 11 join up in parallel to serve as input terminals of control signals to connect with an signal output terminal of the MCU 9. Outputs of pins 14 and 15 of the chip N2 serve as output terminals of the horizontal driving pulse HP and the vertical sync signal CT of the switcher B 8 respectively and connect to inputs of the polarity discrimination shaping circuit 34. The pin 15 of the chip N2 also serves as an output terminal of the horizontal driving pulse HP of the switcher B 8 and connects with an input terminal of the horizontal driving and amplifying circuit 32, as shown in FIG. 4. When the control signal is high in power level (>3.5V), the television's horizontal and vertical sync signal and horizontal driving pulse signal are selected and output from the pins 4, 14 and 15. When the control signal is low in power level (<0.7V), the computer's horizontal and vertical sync signal and horizontal driving pulse signal are selected and output from the pins 4, 14 and 15.

Figure 5:
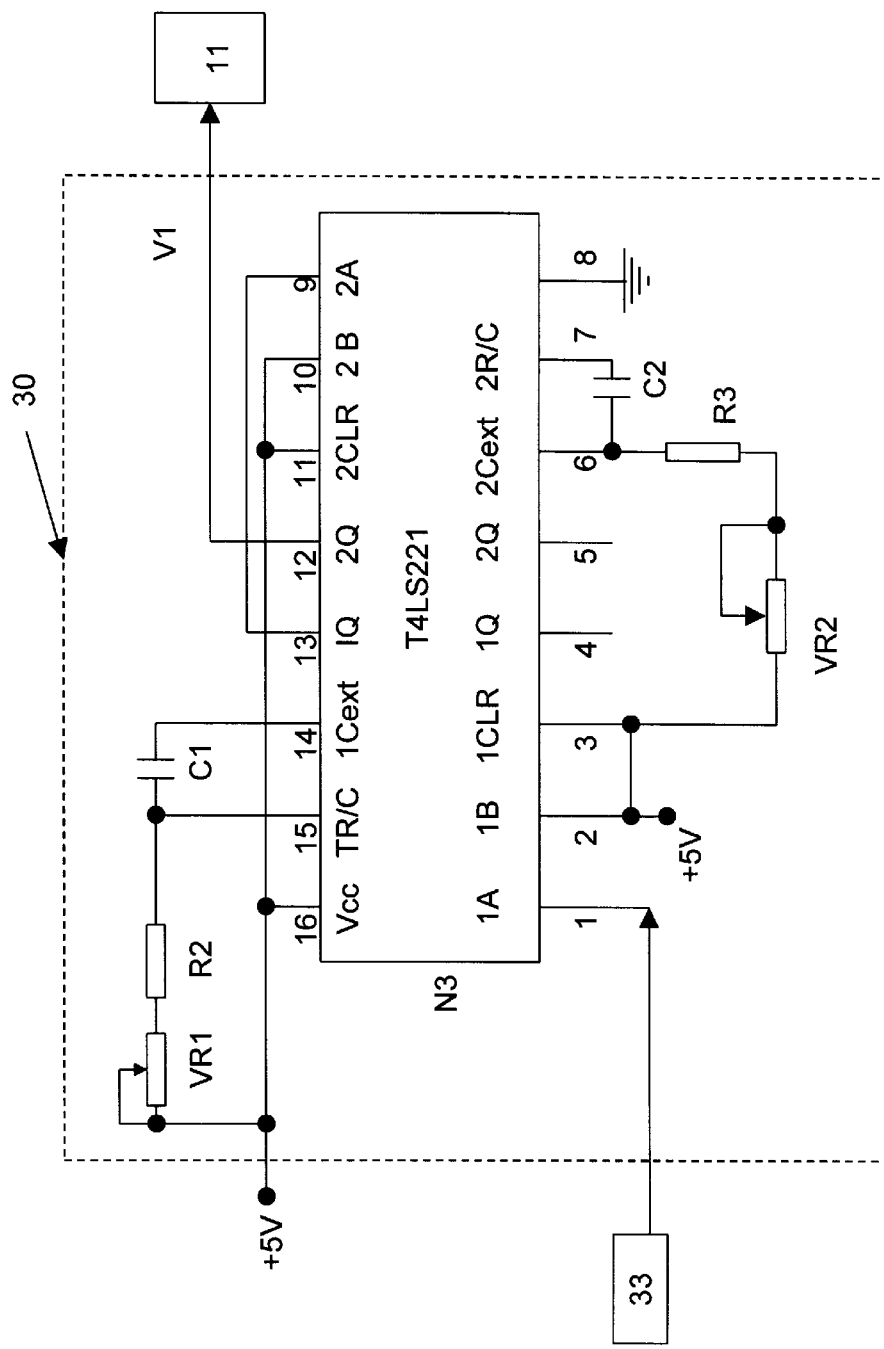
FIG. 5 is a schematic electrical diagram of a TV flyback pulse simulating circuit of the multi-functional monitor according to the above preferred embodiment of the present invention.
Figure 6:
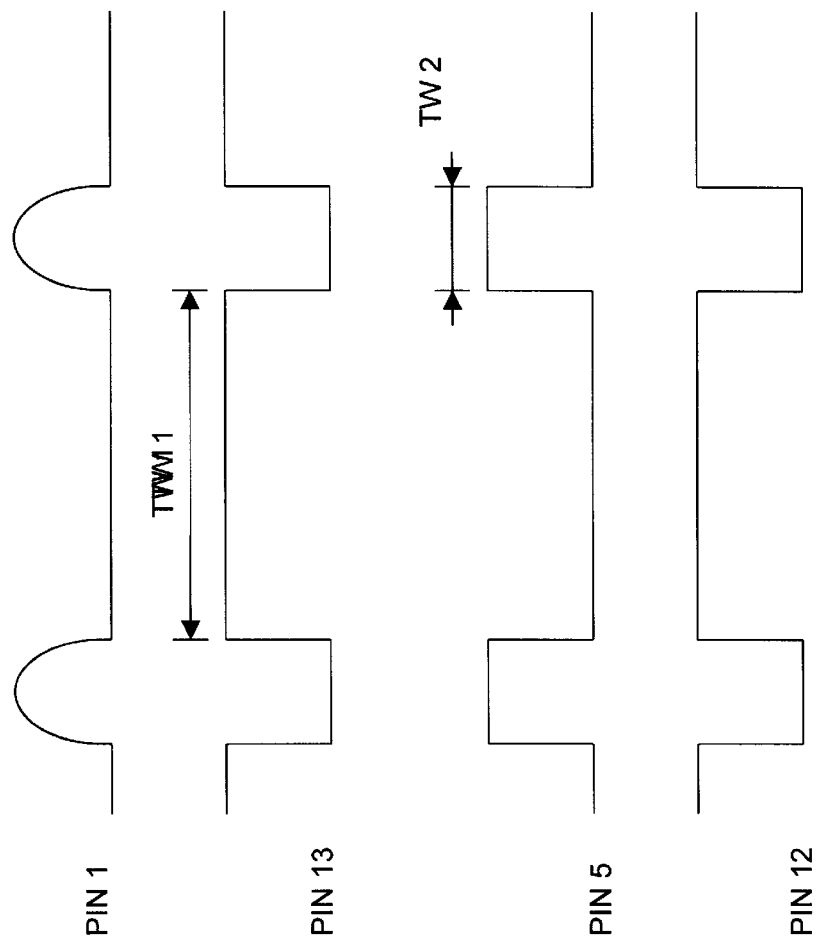
FIG. 6 is a time chart of the pins 1, 13, 5, 12 of the TV flyback pulse simulating circuit of the multi-functional monitor according to the above preferred embodiment of the present invention.

As shown in FIG. 5, the TV flyback pulse simulating circuit 30 comprises a bistable multivibrator integrated circuit (IC) N3, a first and a second resistor R2 and R3, a first and a second potentiometer VR1 and VR2, and a first and a second capacitor C1 and C2. Pins 14 and 15 of IC N3, which have joined in parallel up with the first capacitor C1, the first potentiometer VR1 and the first resistor R2, are connected in series in between the pins 15 and 16 of the N3, while pins 10, 11, 16, 2 and 3 of IC N3 are connected with the power supply. Pin 6 and pin 7 of IC N3 are connected in parallel with the second capacitor C2 and pins 3 and 6 are connected with the second potentiometer VR2 and the second resistor R3 which are joined in series together. Pin 1 of IC N3 serves as a signal input terminal of the TV flyback pulse simulating circuit 30 and connects with a signal output terminal of the fly back transformer (FBT) 33 which works in computer (VGA) display mode. Pin 12 of IC N3 serves as a signal output terminal of the TV flyback pulse simulating circuit 30 to connect with an input terminal of the PIF, SIF color decoder and horizontal and vertical deflection circuit 11. A first way of the bistable multivibrator integrated circuit N3 has been designed into descent edge trigger. The pulse width TW1 is regulated by the first potentiometer VR1. A second way of the bistable multivibrator integrated circuit N3 has also been designed into descent edge trigger. The pulse width TW2 is regulated by the second potentiometer VR2. The relationship of the time sequence is shown as in FIG. 6. In comparison with the pin 1, the climbing edge has obviously been advanced and the pulse width has been widened in terms of the pulse of the pin 5.

Figure 7:
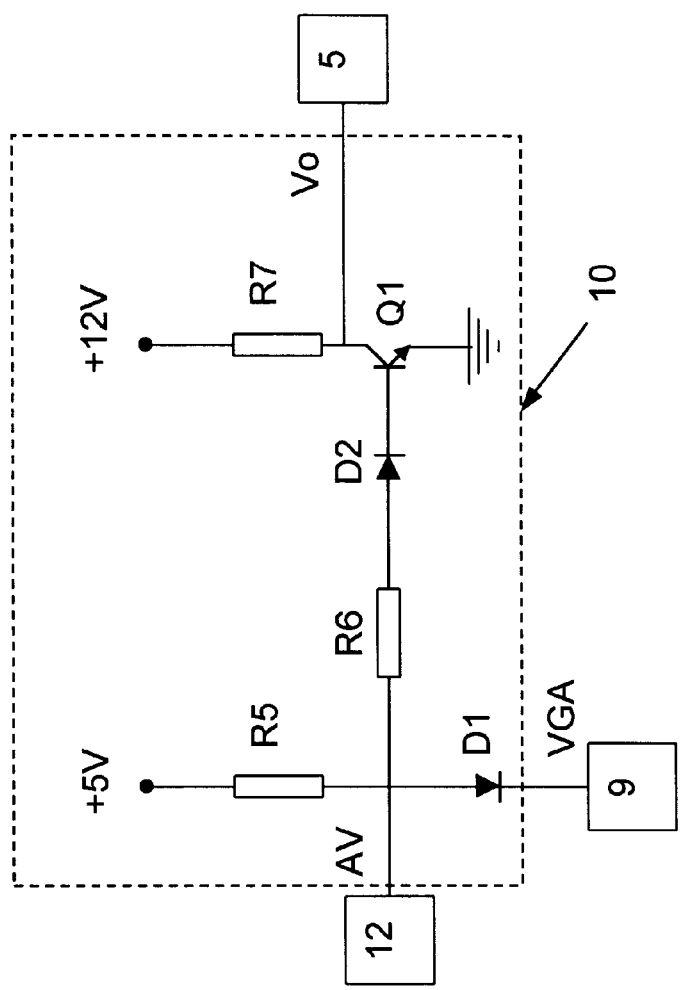
FIG. 7 is a schematic electrical diagram of an integrated control circuit of the multi-functional monitor according to the above preferred embodiment of the present invention.

Referring to FIG. 7, the integrated control circuit 10 comprises a transistor Q1, three resistors R5, R6 and R7 and two diodes D1 and D2. A base lead of the transistor Q1 is connected in series with the diode D2 and the resistor R6 to form an AV input terminal (AV) of the integrated control circuit 10 for connecting with one of the outputs of a TV mode remote control and AV switching MCU 12. The resistor R5 and the diode D1 is bridging connected between the AV input terminal (AV) and the resistor R6. One end of the resistor R5 is connected to the power supply. Another end of the diode D1 serves as another input terminal of the flyback pulse simulating circuit 10 for connecting with a signal input terminal of the MCU 9. An emitter of the transistor Q1 is grounded and a controller of the transistor Q1 is divided into two ways, one of which is connected through the resistor R7 with the power supply, and another way which serves as an output terminal of the integrated control circuit 10 for connecting with one of the inputs of the AV switching circuit 5. When the system is operating in the computer (VGA) display mode, the VGA=0V, the transistor Q1 is cut off. No matter what sort of power level AV outputs, it is to be clamped at 0.7V if the output is located at high power level, therefore V0≈12V. When the system is operating in television (TV) display mode, VGA≈12V and diode D1 is cut off in an opposite direction. At this moment, the AV output is high power level which is to saturate and break over the transistor Q1, and V0≈0.3V. The low power level of the AV output shuts off the transistor Q1, then V0≈12V that the V0 keeps the AV switching circuit 5 under control.

Figure 8:
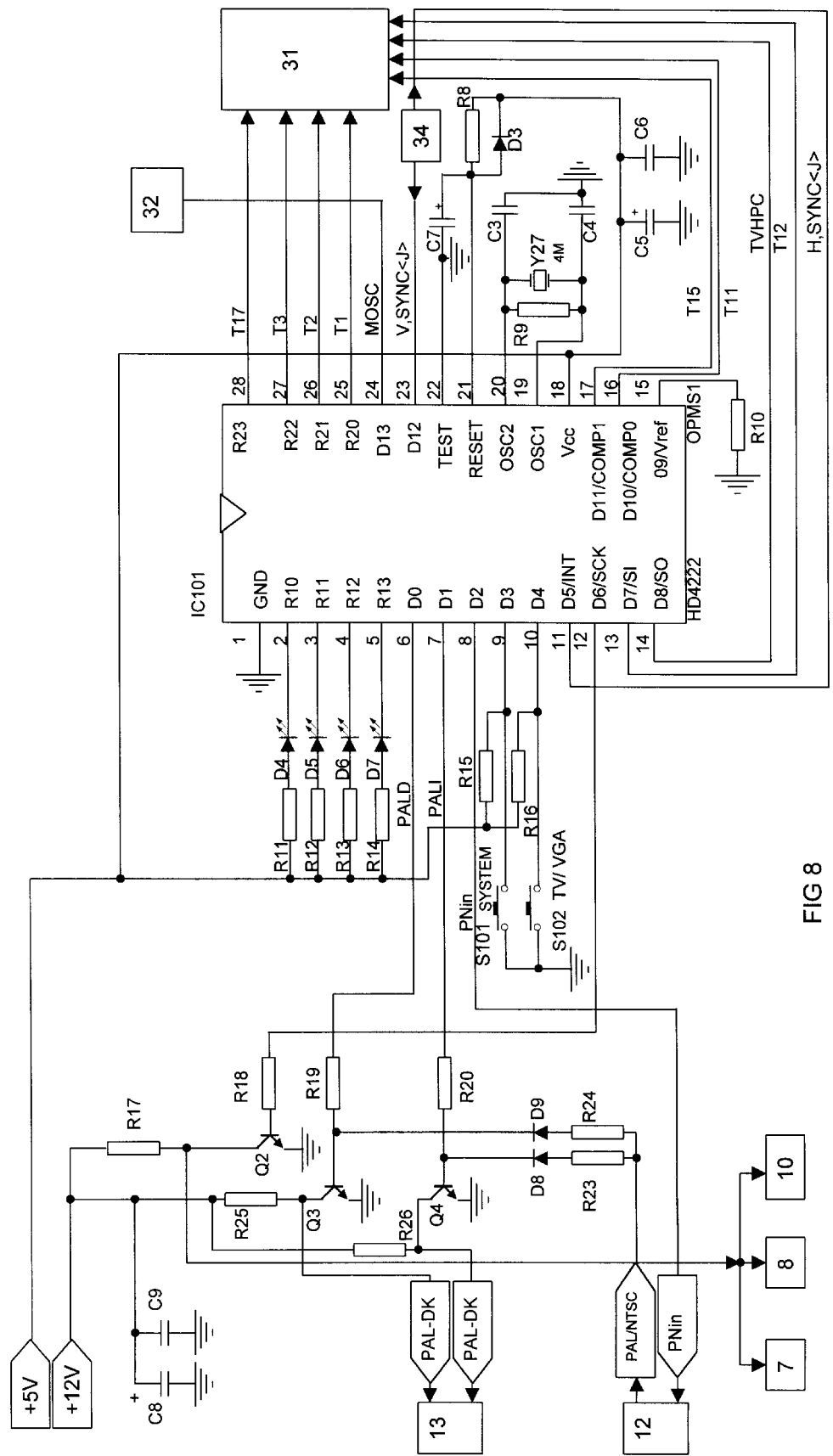
FIG. 8 is a schematic electrical diagram of a micro controller unit, MCU, of the multi-functional monitor according to the above preferred embodiment of the present invention.

FIG. 8 illustrates the micro controller unit (MCU) 9 which comprises a SCP chip 91, fifteen resistors R8 to R20, R23, R24, seven capacitors C3 to C9, a crystal Y1, seven diodes D3 to D9, and three transistors Q2 to Q4. Pins 19 and 20 of the SCP 91 form the principle oscillating circuit. The resistor R9 and the crystal Y1 which are connected in parallel are coupled with in between the pins 19 and 20 and are grounded respectively through the capacitors C3 and C4. Pin 21 of the SCP 91 is grounded via the capacitor C7 and is connected with the 5V power supply via the resistor R8 and the diode D3. In the instance of power on and increasing of electricity, the pin 21 is to remain in low power level for a while before it is converted into a high power level because the power voltage of the capacitor C7 can not jump up immediately. Accordingly, a resetting procedure is finished. Pin 22 of the SCP 91 serves as a testing end and is grounded in normal operation. Pin 11 of the SCP 91 has been designed as an external interrupter by means of a software. Pins 2–10, 12–17 and 23–28 are served as I/O terminals, wherein the pins 8 and 9 are externally and respectively connected with two soft-touch switches S101 and S102 to serve as the keyboards of the multi-functional monitor of the present invention.

When the soft-touch switches S101 and S102 are pressed down, the SCP 91 may effectively process various programs, wherein the soft-touch switch S101 serves switching from computer display mode to television display mode and the soft-touch switch S102 serves a television receiving switch. Simultaneously pressing down both the soft-touch switches S101 and S102 would result in the switching of the TV receiving mode from automatic way to manual way. When the pins 2, 3, 4, 5 are high in power level, illuminating diodes D4, D5, D6, D7 die out, and light on vis-à-vis. The diode D4 indicates that the control of the TV receiving mode is in the automatic way or in the manual way. The diode D5 indicates that the multi-functional monitor is working in the computer display mode or the television display mode. The diode D6 indicates that the TV receiving mode is working in PAL mode or in NTSC mode. The diode D7 indicates whether it is PAL-DK and PAL-I in the PAL mode. The pins 6 and 7 in the receiving mode are respectively defined as a PALD and a PALI output terminal and are respectively connected with the transistors Q3 and Q4, of which inverting outputs which is serving as the collectors of the transistors Q3 and Q4 are respectively defined as a PAL-DK and a PAL-I output terminal for connecting with an input terminal of the multi system color receiver 13. Meanwhile, the transistors Q3 and Q4 are respectively connected with the PAL/NTSC terminal via the diode D8, the resistor R23, the diode D9, and the resistor R24. It is apparent that when the PAL/NTSC terminal is high in power level, the transistors Q3 and Q4 are forced to saturate and break over, so that the PAL-DK and the PAL-I will be low in power level no matter what kind of power level outputted by the pins 6 and 7 of the SCP 91. When the PAL/NTSC terminal is low in power level, it is unable to make any influence on the transistors Q3 and Q4 because the diodes D8 and D9 have been ceased.

The pin 12 of the SCP 91 is connected, via the resistor R18, with the transistor Q2 which output is defined as VGA serving as a collector of the transistor Q2. The collector of the transistor Q2 serves as an output terminal connecting to the inputs of the switcher A 7, the switcher B 8 and the integrated control circuit 10. The pin 8 of the SCP 91 which serves as a selecting output of the television receiving mode is defined as PNin. During the television display mode and receiving the PAL mode, the pin 8 outputs high power level. During receiving the NTSC mode, the pin 8 outputs low power level. Moreover, the pin 8 is connected with an input terminal of the switching MCU 12. The pins 17, 25–28 are utilized in the horizontal width and geometric distortion of the control circuit 31. The pins 13, 14 and 16 serve as a selector of the power supply voltage and controlling horizontal and vertical free oscillation frequency of the control circuit 31. The pin 18 of the SCP 91 which serves as a power supplying end is connected with the +5V power supply and is decoupled through the grounded capacitors C5 and C6. The pin 1 is a grounding end of the SCP 91. The pins 23 and 11 are linked with the horizontal and vertical sync signals. The SCP 91 controls different display modes according to the frequency and the polarity of the horizontal and vertical sync signals. The pin 24 of the SCP 91 which serves as an input of MOSC is connected with the driving and amplifying circuit 32 for cutting off the horizontal driving pulse during switching the display mode, so as to terminate the concern of the horizontal output and remain in low power level for three seconds before converting into the high power level in order to avoid the production of an over-high voltage of the CRT display tube 4 which is a second B-plus during the process of switching.

Through a program P which is consolidated in SCP 91, the MCU 9 can manage and control the switcher A 7, the switcher B 8, the TV signal processing circuit 1, the integrated control circuit 10, and the H/V deflection circuit 3, so as to enable the multi-functional monitor to judge automatically the frequency and polarity of the input signals and to achieve the accurate option of the PAL mode or the NTSC mode as well as the VGA mode thereof.

Figure 9A:
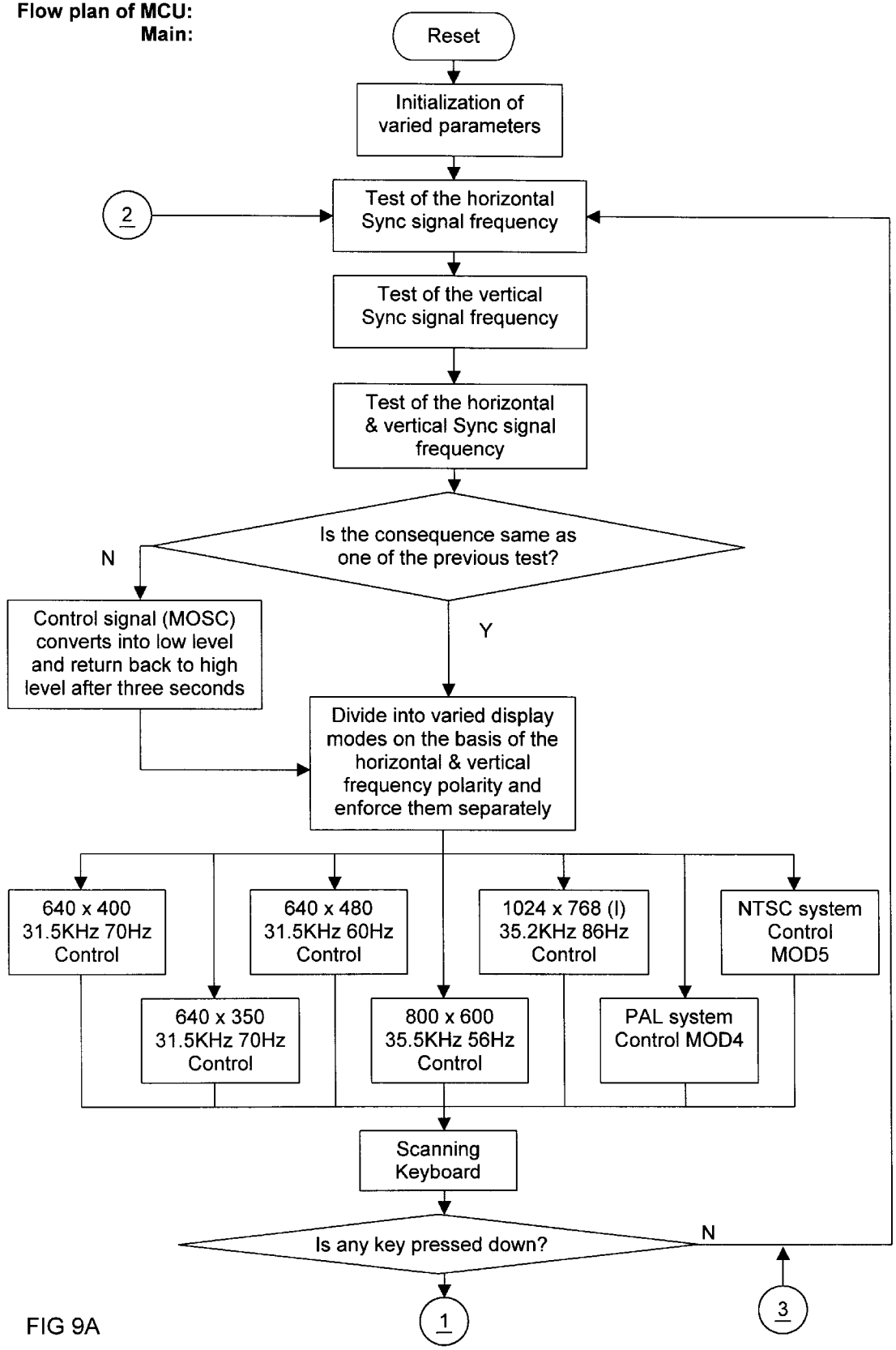
FIGS. 9A to 9D are the flow charts of the program P which is consolidated on the MCU of the multi-functional monitor according to the above preferred embodiment of the present invention.
Figure 9B:
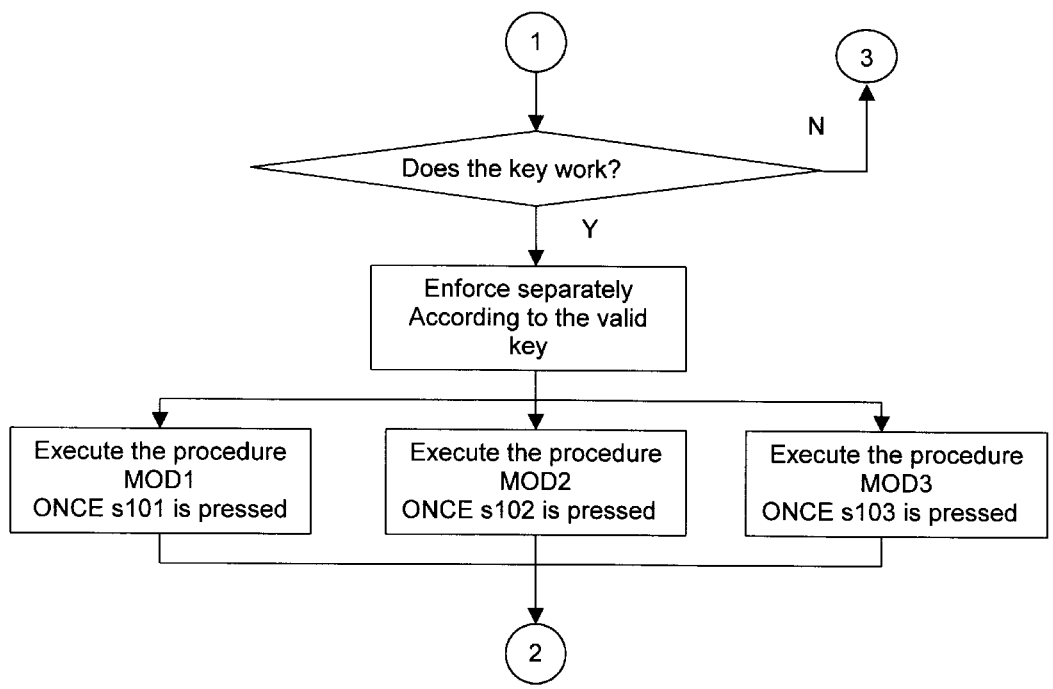
Figure 9B:
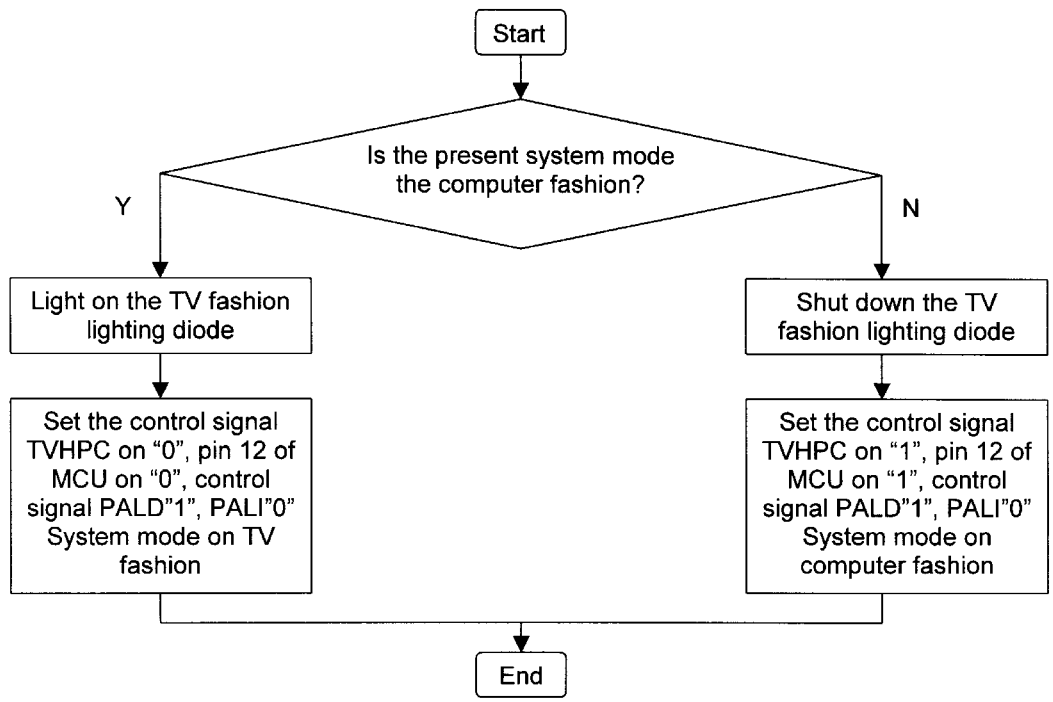

The flow charts as shown in FIGS. 9A to 9D illustrate the program P which is briefly specified hereafter. First, power up and reset for the initialization of the varied parameters. It is then followed by testing the frequency and polarity of the horizontal and vertical sync signals. The consequence of the test is finally judged of the equivalence. If it is not the same, control signal MOSC is converted into low power level and then returned back to high power level after three seconds. If it is the same, a certain subcircuit among seven control modes which are below the node E of the FIG. 9A is immediately to be enforced on the basis of the frequency and the polarity subbranch of the horizontal and vertical sync signal which has been obtained by test. The scanning keyboard is next to perform a module MOD1 in case of the active key of the soft-touch switch S101 being pressed down. A module MOD2 is to be performed in case of the active key of the soft-touch switch S102 being pressed down. A module MOD3 is to be performed in case of the active keys of the soft-touch switches S101 and S102 being simultaneously pressed down. The test of the frequency and the polarity of the horizontal and vertical sync signal once the performance has been finished is restored as it was at the beginning.

The subprogram controlling module MOD1 performs functions as follows. To judge whether the computer is presently working in the computer display mode. If yes, to light on the TV mode illuminating diode D5, to set the control signal TVHPC on "0", to set the pin 12 of the SCP 91 on "0", to set the control signal PALD on "1", to set the PALI on "0", and to set the mode of the multi-functional monitor on "TV" position. If not, to shut down the TV mode illuminating diode D5, to set the control signal TVHPC on "1", to set the pin 12 of SCP 91 on "1", to set the control signal PALD on "1", to set the PALI on "0", and to set the mode of the multi-functional monitor on "computer" position.

Figure 9C:
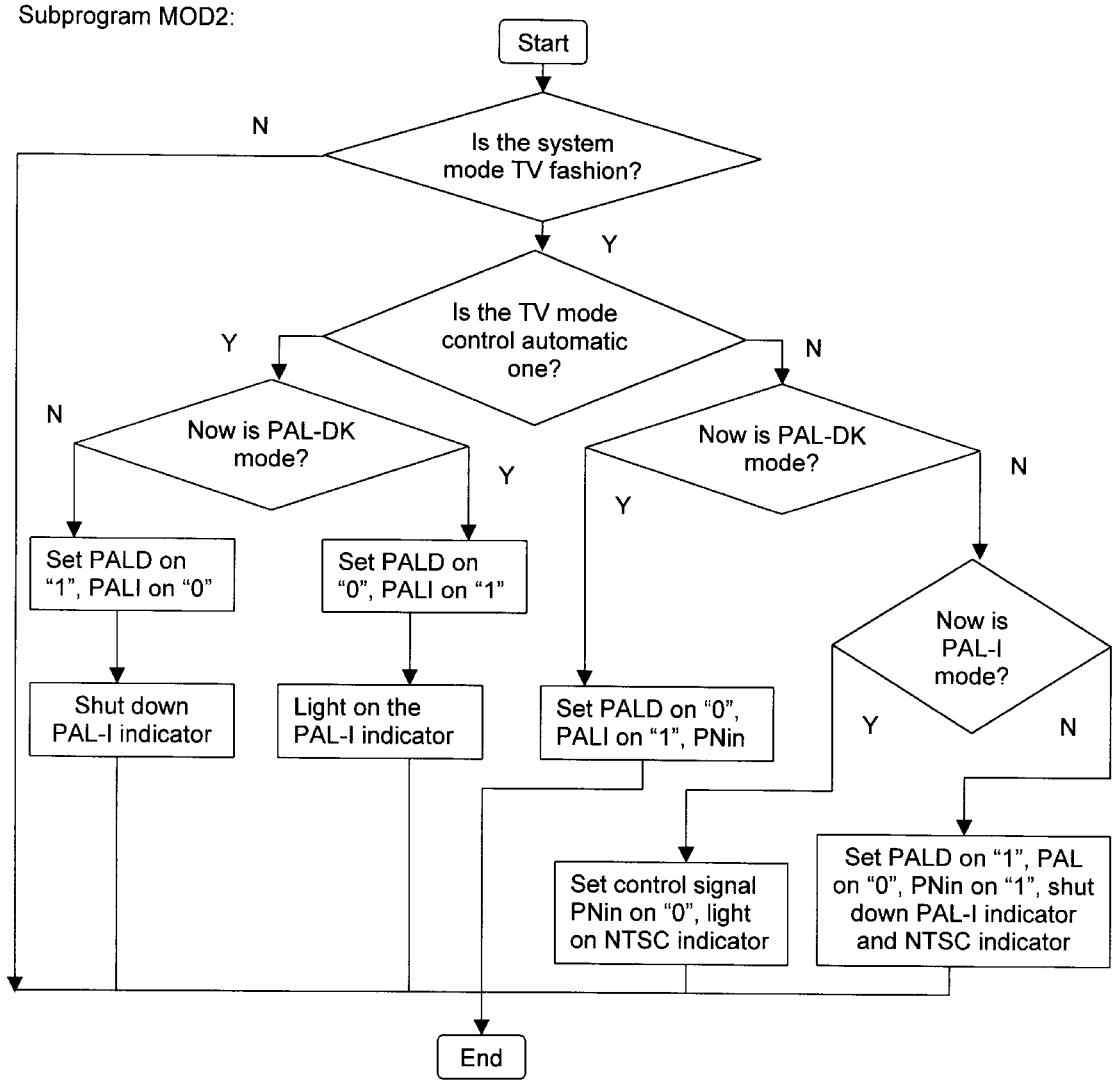
Figure 9C:
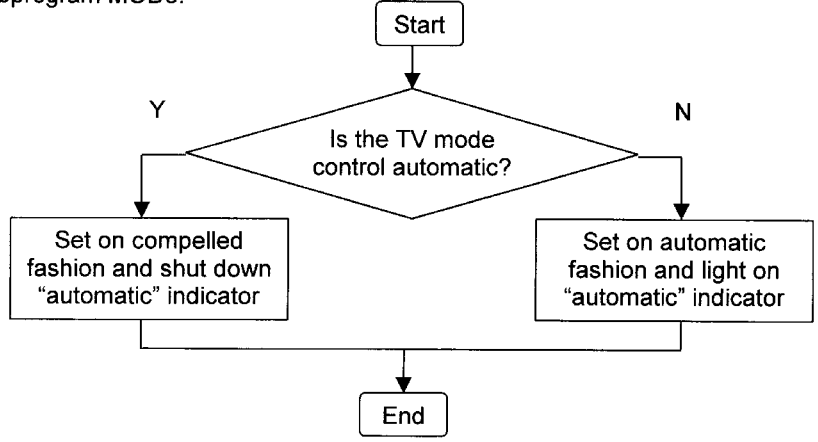
Figure 9D:
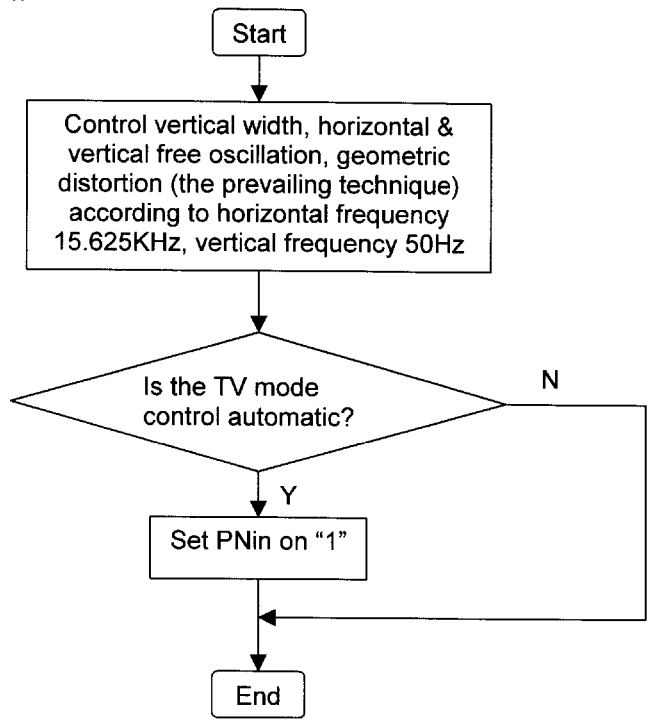
Figure 9D:
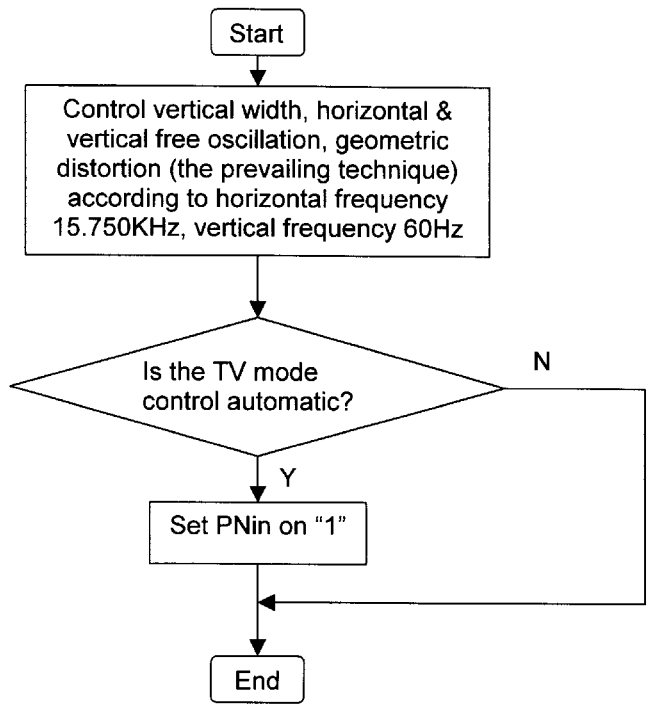

The functions of the other subprogram controlling modules MOD2 to MOD5 are briefly illustrates in the flow charts as shown in FIGS. 9C and 9D.

In accordance with the above disclosure of the present invention, the multi-functional monitor of the present invention can achieve the following advantages over the prior arts. It is an organic combination of the functions of the computer color monitor CRT and that of the multi system color television with additional functions of Karaoke and AV output/input and FM radio receiver. It can be easily used in multimedia ways as it does not need any external speakers and sources of input of the AV signals. It is relatively not high in the cost performance and it is particularly suitable for being utilized in the interactive and mutual-active data network which is composed of computer, broadcast and telecommunication.

What is claimed is:

1. A multi-functional monitor, comprising a signal amplifying circuit;

a H/V deflection circuit connected with said signal amplifying circuit;

a CRT display tube connected with said signal amplifying circuit;

a switcher A connected with said signal amplifying circuit for switching a television RGB (red, green and blue) signal and a computer RGB (red, green and blue) signal;

a switcher B connected with said H/V deflection circuit and said switcher A for switching a horizontal and vertical sync signal and a horizontal driving pulse signal;

a micro controller unit (MCU) connected with said H/V deflection circuit, said switcher A and said switcher B for switching control of a computer display mode and a television display mode;

a TV signal processing circuit connected with said switcher A;

an integrated control circuit connected with said micro controller unit and said TV signal processing circuit; and a TV flyback pulse simulating circuit connected with said H/V deflection circuit and said TV signal processing circuit;

a plurality of signal input terminals of said switcher A, said switcher B, said TV signal processing circuit, and said integrated control circuit being connected with a plurality of corresponding outputs of said micro controller unit, said H/V deflection circuit being bi-directional connected with said micro controller unit so that signals are able to be mutually transferred therebetween;

another two signal input terminals of said switcher A for said television RGB signal (TV RGB) and said computer RGB signal (VGA RGB) being respectively connected to said TV signal processing circuit and a computer RGB signal output terminal, a signal output terminal of said switcher A being connected to an input terminal of said signal amplifying circuit;

another two signal input terminals of said switcher B, for said horizontal and vertical sync signal and said horizontal driving pulse signal of computer (VGAFP) and said horizontal and vertical sync signal and said horizontal driving pulse signal of television (TVFP), being respectively connected with a signal output terminal of said TV signal processing circuit and an output terminal of said horizontal and vertical sync signal of computer, a signal output terminal of said switcher B being connected to an input terminal of said H/V deflection circuit;

two output terminals of said H/V deflection circuit being respectively connected to an input terminal of said signal amplifying circuit and an input terminal of said TV flyback pulse simulating circuit, an output terminal of said signal amplifying circuit being connected with said CRT display tube; and another two input terminals of said TV signal processing circuit being respectively connected to two input terminals of a RF signal output of said television and a output terminal of said TV flyback pulse simulating circuit, two signal input terminals of said integrated control circuit being respectively connected to an output terminal of said TV signal processing circuit and an output terminal of said micro controller unit.

2. A multi-functional monitor, as recited in claim 1, further comprising an AV switching circuit and a video/audio output and input circuit connected with said AV switching circuit, said AV switching circuit being connected with said TV signal processing circuit and said integrated control circuit, wherein said TV signal processing circuit and said AV switching circuit are bi-directionally connected with each other, and that said AV switching circuit and said video/audio output and input circuit are also bi-directionally connected with each other, so as to enable signals transferring bi-directionally therebetween, a signal output terminal of said integrated control circuit being connected to an input terminal of said AV switching circuit.

3. A multi-functional monitor, as recited in claim 2, wherein said signal amplifying circuit comprises a video processor clamp and automatic brightness control connected with said switcher A and a cascode and blanking circuit connected between said video processor clamp and automatic brightness control and said CRT display tube, said video processor clamp and automatic brightness control and said cascode and blanking circuit being utilized by both a computer display mode and a television display mode, said RGB signal of said computer (VGA RGB) and said RGB signal of said television (TV RGB) exercising transferring and switching through said switcher A under a control of said micro controller unit, said RGB signals after processing by said video processor clamp and automatic brightness control being transferred to said cascode and blanking circuit for amplification, and that blanking signals meanwhile are added in at the time of horizontal/vertical retrace, said amplified red, green and blue RGB signal being suitable for displaying through said CRT display tube.

4. A multi-functional monitor, as recited in claim 3, wherein said H/V deflection circuit is utilized and employed by both said computer (VGA) display mode and said television (TV) display mode, an operation of switching said horizontal and vertical sync signal and said horizontal driving pulse signal of said computer and that of said TV being conducted by said switcher B and being controlled by said micro controller unit, wherein said H/V deflection circuit comprises a control circuit for horizontal and vertical oscillation, synchronization, driving pulse output, horizontal and vertical frequency control, and vertical width control, in which said control circuit has an output and an input respectively connected to said switcher B and said micro controller unit, a driving and amplifying circuit having two inputs connected to an output of said switcher B and an output of said micro controller unit, a computer mode fly back transformer (VGA mode FBT) having an input connected to an output of said driving and amplifying circuit and two outputs respectively connected to an input of said TV flyback pulse simulating circuit and an input of said CRT display tube, a polarity discrimination shaping circuit which is connected with said VGA mode FBT having an input connected to an output of said switcher B and two outputs respectively connected to an input of said video processor clamp and automatic brightness control and an input of said video processor clamp and automatic brightness control, a power amplifying circuit having an input connected to an output of said control circuit, and a composite circuit having an output connected with an input of said cascode and blanking circuit and two inputs respectively connected with an output of said power amplifying circuit and an output of said VGA mode FBT, in which said horizontal driving pulse signals are received by said driving and amplifying circuit where to acquire a horizontal DY scanning current and various high voltages by coordinating of said VGA mode FBT, said horizontal and vertical sync signals entering through said polarity discrimination shaping circuit into said control circuit to complete said horizontal and vertical oscillation, said synchronization, said driving pulse output, said horizontal and vertical frequency control, and said vertical width control, of which said horizontal driving pulse shapes a square wave and a vertical driving pulse saw tooth wave.

5. A multi-functional monitor, as recited in claim 4, wherein said TV signal processing circuit comprises a deflection circuit for picture intermediate-frequency signal (PIF), SIF chroma signal decode and horizontal and vertical deflection circuit, a switching micro controller unit for TV mode remote-control/AV switching, a multi color system receiving circuit, a TV turner, a surface audio wave (SAW) filter, and a compound circuit electrically connected.

6. A multi-functional monitor, as recited in claim 5, wherein said horizontal driving pulse is produced by said control circuit through said switcher B when said multi-functional monitor is working in said TV display mode, that is said driving pulse which has entered into said horizontal driving/amplifying circuit is produced by said control circuit when said multi-functional monitor is working in said computer display mode, and that in said TV displace mode, said driving pulse which has entered into said horizontal driving/amplifying circuit is produced by said deflection circuit for picture intermediate-frequency signal (PIF), SIF chroma signal decode and horizontal and vertical deflection circuit of said TV signal processing circuit, said vertical driving saw tooth wave produced by said control circuit entering into said vertical power amplifying circuit to acquire a vertical deflection current to produce at the same time a flyback pulse which is received by said composite circuit together with a horizontal flyback pulse yielded by said VGA mode FBT to form a composite blanking pulse which is to be dispatched to said cascode and blanking circuit.

7. A multi-functional monitor, as recited in claim 6, wherein, in said TV signal processing circuit, a RF signal from television TV enters said TV turner, supplying a secondary RF signal, wherein control signals are provided by said switching mirco controller unit and said deflection circuit, mainly AFT (automatic frequency tune) and AGC (automatic gain control) band selections, said secondary RF signal being processed by said surface audio wave (SAW) filter to obtain said picture intermediate-frequency signal (PIF), in which PAL/NTSC power levels which provided by said switching micro controller unit select two modes of difference intermediate-frequency features, said PIF signal from said SAW filter entering said deflection circuit, wherein a part of said PIF creates a full TV signal which contains audio signal and is sent to said multi color system receiving circuit that is controlled by PAL-1 and PAL-DK signals provided from said micro controller unit and PAL/NTSC signals provided from said switching micro controller unit for selecting different composition of band pass and band gap filters in order to adapt a requirement of various television (TV) modes, said multi color system receiving circuit finally sending out a non-aural accompanied video frequency signal VIDEO to said AV switching circuit, at the same time, an aural accompanied tune signal and said non-aural VIDEO signal returning back to said deflection circuit via a switching process exercised by said AV switching circuit for color decoding and sound decoding, in which an aural output from said deflection circuit is dispatched to said AV switching circuit and said coloring decoding provides brightness and chroma signals which are sent to said compound circuit for compounding to form a TV RGB signal sending to said switcher A, so that when said color decoding is processing in said deflection circuit, color sync signals are needed to be gated, however a width of said horizontal retrace pulse sending from said VGA mode FBT is relatively too small for selecting said a group of said color sync pulses, therefore, said horizontal retrace pulse is necessary to make wider by advancing a leading edge through said TV flyback pulse simulating circuit, said horizontal retrace pulse which has been reshaped being sent into said deflection circuit.

8. A multi-functional monitor, as recited in claim 7, wherein said AV switching circuit is an audio frequency and video frequency switcher, which has a plurality of inputs for respectively receiving an external VIDEO IN, an external right and left channel AUDIO IN, said VIDEO sending from said multi color system receiving circuit, and a left and right audio signal sending from said deflection circuit, an output of said AV switching circuit being a clamp output, that is a VIDEO output (VIDEO OUT) and a left and right AUDIO signals output (AUDIO OUT) for use of external devices.

9. A multi-functional monitor, as recited in claim 8, wherein another output of said AV switching circuit which is controlled by said integrated control circuit is connected is connected to a Karaoke delay living circuit which is further connected to an audio amplifying circuit, so that when said display mode is operating, a video frequency and an audio frequency are sent into said deflection circuit, and the that said Karaoke delay living circuit is either said external VIDEO IN and AUDIO IN signals or said VIDEO and AUDIO signals sent from said deflection circuit and said multi color system receiving circuit, and that when said computer display mode is operating, said AV switching circuit is forced to select said external VIDEO and AUDIO signals (VIDEO IN and AUDIO IN), said control of volume is conveyed in by said switching micro controller unit, said Karaoke delay living circuit being considered as a section of Karaoke, which volume of microphone, volume of echo and selection of Karaoke are also conveyed in by said switching micro controller unit, furthermore there are external microphone and external aural that are conveyed in said AV switching circuit, an audio signal which has been processed being divided into a left way and a right way which are then sent into said audio amplifying circuit for being amplified so as to drive a left and a right speaker (SPEAKER), moreover a FM radio receiver is incorporated with said multi-functional monitor so that said switcher A, said switcher B, said MCU, said TV flyback pulse simulating circuit, and said integrated control circuit enable said multi-functional monitor to receive and display both said computer signals, said TV signals and FM signals.

10. A multi-functional monitor, as recited in claim 9, further comprising a first keyboard which is a keyboard circuit connected to said micro controller unit, a second keyboard which is another keyboard circuit connected to said switching micro controller unit, so that when either said first keyboard or said second keyboard is pressed, said corresponding micro controller unit or said switching micro controller unit is detected and recognized to make appropriate response.

11. A multi-functional monitor, as recited in claim 10, further comprising a remote control handset where string pulse is formed from an infrared remote control signal which has been demodulated by a receiving head and sent into said switching micro controller unit to become a decode of TV SCP for processing corresponding control.

12. A multi-functional monitor, as recited in claim 1, further comprising a power supply circuit which is a switch stabilized voltage supply providing an alternative input voltage range from 90 to 250 V and 50/60 Hz, wherein within said input voltage range, said power source works normally and provides seven groups of voltage, including 123V, 90V, 56V, 12V, 5V, and 6.3V, wherein one of said voltage supplying said H/V deflection circuit and said signal amplifying circuit is either one of 123V, 90V and 56V, that said switching control is processed by a switching control circuit with said control signal furnished by said micro controller unit, and that practically, to operate in said TV display mode is 56V, and that to operate in said computer display mode is 123V when said horizontal frequency is over 40 Hz, otherwise is 90V.

13. A multi-functional monitor, as recited in claim 11, further comprising a power supply circuit which is a switch stabilized voltage supply providing an alternative input voltage range from 90 to 250 V and 50/60 Hz, wherein within said input voltage range, said power source works normally and provides seven groups of voltage, including 123V, 90V, 56V, 12V, 5V, and 6.3V, wherein one of said voltage supplying said H/V deflection circuit and said signal amplifying circuit is either one of 123V, 90V and 56V, that said switching control is processed by a switching control circuit with said control signal furnished by said micro controller unit, and that practically, to operate in said TV display mode is 56V, and that to operate in said computer display mode is 123V when said horizontal frequency is over 40 Hz, otherwise is 90V.

14. A multi-functional monitor, as recited in claim 1, wherein said switcher A is an analogue triple SPDT chip N1 having outputs of pins 1, 3 and 13 which are considered as input terminals of TV RGB signals, outputs of pins 2, 5 and 12 which are input terminals of computer RGB signals, outputs of pins 9, 10 and 11 which have joined up in parallel as said input terminals of said control signals VGA being connected with one signal output terminal of said micro controller unit, wherein pins 4, 14 and 15 are output terminals of said RGB signal of said switcher A, which are connected with a plurality of input terminals of said video processor clamp and automatic brightness control, so that when said control signal VGA is high in power level (>3.5V), said TV RGB signals are selected and output from said pins 4, 14 and 15, and that when said control signal VGA is low in power level (<0.7V), said computer RGB signals are selected and output from said pins 4, 14 and 15.

15. A multi-functional monitor, as recited in claim 9, wherein said switcher A is an analogue triple SPDT chip N1 having outputs of pins 1, 3 and 13 which are considered as input terminals of TV RGB signals, outputs of pins 2, 5 and 12 which are input terminals of computer RGB signals, outputs of pins 9, 10 and 11 which have joined up in parallel as said input terminals of said control signals VGA being connected with one signal output terminal of said micro controller unit, wherein pins 4, 14 and 15 are output terminals of said RGB signal of said switcher A, which are connected with a plurality of input terminals of said video processor clamp and automatic brightness control, so that when said control signal VGA is high in power level (>3.5V), said TV RGB signals are selected and output from said pins 4, 14 and 15, and that when said control signal VGA is low in power level (<0.7V), said computer RGB signals are selected and output from said pins 4, 14 and 15.

16. A multi-functional monitor, as recited in claim 11, wherein said switcher A is an analogue triple SPDT chip N1 having outputs of pins 1, 3 and 13 which are considered as input terminals of TV RGB signals, outputs of pins 2, 5 and 12 which are input terminals of computer RGB signals, outputs of pins 9, 10 and 11 which have joined up in parallel as said input terminals of said control signals VGA being connected with one signal output terminal of said micro controller unit, wherein pins 4, 14 and 15 are output terminals of said RGB signal of said switcher A, which are connected with a plurality of input terminals of said video processor clamp and automatic brightness control, so that when said control signal VGA is high in power level (>3.5V), said TV RGB signals are selected and output from said pins 4, 14 and 15, and that when said control signal VGA is low in power level (<0.7V), said computer RGB signals are selected and output from said pins 4, 14 and 15.

17. A multi-functional monitor, as recited in claim 13, wherein said switcher A is an analogue triple SPDT chip N1 having outputs of pins 1, 3 and 13 which are considered as input terminals of TV RGB signals, outputs of pins 2, 5 and 12 which are input terminals of computer RGB signals, outputs of pins 9, 10 and 11 which have joined up in parallel as said input terminals of said control signals VGA being connected with one signal output terminal of said micro controller unit, wherein pins 4, 14 and 15 are output terminals of said RGB signal of said switcher A, which are connected with a plurality of input terminals of said video processor clamp and automatic brightness control, so that when said control signal VGA is high in power level (>3.5V), said TV RGB signals are selected and output from said pins 4, 14 and 15, and that when said control signal VGA is low in power level (<0.7V), said computer RGB signals are selected and output from said pins 4, 14 and 15.

18. A multi-functional monitor, as recited in claim 1, wherein said switcher B is an analogue triple SPDT chip N2 having outputs of pins 1, 3 and 13 of N2 respectively serving as input terminals of a horizontal sync signal TVHT, a vertical sync signal TVCT and said horizontal driving pulse signal TVHP of said television, outputs of pins 2, 5 and 12 respectively serving as input terminals of a horizontal sync signal VGAHT, a vertical sync signal VGACT and said horizontal driving pulse signal VGAHP of said computer, outputs of pins 9, 10 and 11 joining up in parallel to serve as input terminals of control signals to connect with a signal output terminal of said micro controller unit, outputs of pins 14 and 15 of said chip N2 serving as output terminals of said horizontal driving pulse HP and said vertical sync signal CT of said switcher B respectively and connecting to inputs of said polarity discrimination shaping circuit, said pin 15 of said chip N2 also serving as an output terminal of said horizontal driving pulse HP of said switcher B and connecting with an input terminal of said horizontal driving and amplifying circuit, so that when said control signal is high in power level (>3.5V), said horizontal and vertical sync signal and said horizontal driving pulse signal of said television are selected and output from said pins 4, 14 and 15, and that when said control signal is low in power level (<0.7V), said horizontal and vertical sync signal and said horizontal driving pulse signal of said computer are selected and output from said pins 4, 14 and 15.

19. A multi-functional monitor, as recited in claim 14, wherein said switcher B is an analogue triple SPDT chip N2 having outputs of pins 1, 3 and 13 of N2 respectively serving as input terminals of a horizontal sync signal TVHT, a vertical sync signal TVCT and said horizontal driving pulse signal TVHP of said television, outputs of pins 2, 5 and 12 respectively serving as input terminals of a horizontal sync signal VGAHT, a vertical sync signal VGACT and said horizontal driving pulse signal VGAHP of said computer, outputs of pins 9, 10 and 11 joining up in parallel to serve as input terminals of control signals to connect with a signal output terminal of said micro controller unit, outputs of pins 14 and 15 of said chip N2 serving as output terminals of said horizontal driving pulse HP and said vertical sync signal CT of said switcher B respectively and connecting to inputs of said polarity discrimination shaping circuit, said pin 15 of said chip N2 also serving as an output terminal of said horizontal driving pulse HP of said switcher B and connecting with an input terminal of said horizontal driving and amplifying circuit, so that when said control signal is high in power level (>3.5V), said horizontal and vertical sync signal and said horizontal driving pulse signal of said television are selected and output from said pins 4, 14 and 15, and that when said control signal is low in power level (<0.7V), said horizontal and vertical sync signal and said horizontal driving pulse signal of said computer are selected and output from said pins 4, 14 and 15.

20. A multi-functional monitor, as recited in claim 15, wherein said switcher B is an analogue triple SPDT chip N2 having outputs of pins 1, 3 and 13 of N2 respectively serving as input terminals of a horizontal sync signal TVHT, a vertical sync signal TVCT and said horizontal driving pulse signal TVHP of said television, outputs of pins 2, 5 and 12 respectively serving as input terminals of a horizontal sync signal VGAHT, a vertical sync signal VGACT and said horizontal driving pulse signal VGAHP of said computer, outputs of pins 9, 10 and 11 joining up in parallel to serve as input terminals of control signals to connect with a signal output terminal of said micro controller unit, outputs of pins 14 and 15 of said chip N2 serving as output terminals of said horizontal driving pulse HP and said vertical sync signal CT of said switcher B respectively and connecting to inputs of said polarity discrimination shaping circuit, said pin 15 of said chip N2 also serving as an output terminal of said horizontal driving pulse HP of said switcher B and connecting with an input terminal of said horizontal driving and amplifying circuit, so that when said control signal is high in power level (>3.5V), said horizontal and vertical sync signal and said horizontal driving pulse signal of said television are selected and output from said pins 4, 14 and 15, and that when said control signal is low in power level (<0.7V), said horizontal and vertical sync signal and said horizontal driving pulse signal of said computer are selected and output from said pins 4, 14 and 15.

21. A multi-functional monitor, as recited in claim 16, wherein said switcher B is an analogue triple SPDT chip N2 having outputs of pins 1, 3 and 13 of N2 respectively serving as input terminals of a horizontal sync signal TVHT, a vertical sync signal TVCT and said horizontal driving pulse signal TVHP of said television, outputs of pins 2, 5 and 12 respectively serving as input terminals of a horizontal sync signal VGAHT, a vertical sync signal VGACT and said horizontal driving pulse signal VGAHP of said computer, outputs of pins 9, 10 and 11 joining up in parallel to serve as input terminals of control signals to connect with a signal output terminal of said micro controller unit, outputs of pins 14 and 15 of said chip N2 serving as output terminals of said horizontal driving pulse HP and said vertical sync signal CT of said switcher B respectively and connecting to inputs of said polarity discrimination shaping circuit, said pin 15 of said chip N2 also serving as an output terminal of said horizontal driving pulse HP of said switcher B and connecting with an input terminal of said horizontal driving and amplifying circuit, so that when said control signal is high in power level (>3.5V), said horizontal and vertical sync signal and said horizontal driving pulse signal of said television are selected and output from said pins 4, 14 and 15, and that when said control signal is low in power level (<0.7V), said horizontal and vertical sync signal and said horizontal driving pulse signal of said computer are selected and output from said pins 4, 14 and 15.

22. A multi-functional monitor, as recited in claim 17, wherein said switcher B is an analogue triple SPDT chip N2 having outputs of pins 1, 3 and 13 of N2 respectively serving as input terminals of a horizontal sync signal TVHT, a vertical sync signal TVCT and said horizontal driving pulse signal TVHP of said television, outputs of pins 2, 5 and 12 respectively serving as input terminals of a horizontal sync signal VGAHT, a vertical sync signal VGACT and said horizontal driving pulse signal VGAHP of said computer, outputs of pins 9, 10 and 11 joining up in parallel to serve as input terminals of control signals to connect with a signal output terminal of said micro controller unit, outputs of pins 14 and 15 of said chip N2 serving as output terminals of said horizontal driving pulse HP and said vertical sync signal CT of said switcher B respectively and connecting to inputs of said polarity discrimination shaping circuit, said pin 15 of said chip N2 also serving as an output terminal of said horizontal driving pulse HP of said switcher B and connecting with an input terminal of said horizontal driving and amplifying circuit, so that when said control signal is high in power level (>3.5V), said horizontal and vertical sync signal and said horizontal driving pulse signal of said television are selected and output from said pins 4, 14 and 15, and that when said control signal is low in power level (<0.7V), said horizontal and vertical sync signal and said horizontal driving pulse signal of said computer are selected and output from said pins 4, 14 and 15.

23. A multi-functional monitor, as recited in claim 1, wherein said TV flyback pulse simulating circuit comprises a bistable multivibrator integrated circuit (IC) N3, a first and a second resistor R2 and R3, a first and a second potentiometer VR1 and VR2, and a first and a second capacitor C1 and C2, pins 14 and 15 of said bistable multivibrator integrated circuit N3 which have joined in parallel up with said first capacitor C1, said first potentiometer VR1 and said first resistor R2 being connected in series in between said pins 15 and 16 of said bistable multivibrator integrated circuit N3, while pins 10, 11, 16, 2 and 3 of said bistable multivibrator integrated circuit N3 are connected with a power supply, pin 6 and pin 7 of said bistable multivibrator integrated circuit N3 being connected in parallel with said second capacitor C2 and pins 3 and 6 being connected with said second potentiometer VR2 and said second resistor R3 which are joined in series together, pin 1 of said bistable multivibrator integrated circuit N3 serving as a signal input terminal of said TV flyback pulse simulating circuit and connecting with a signal output terminal of said fly back transformer (FBT) which works in computer VGA mode, pin 12 of said bistable multivibrator integrated circuit N3 serving as a signal output terminal of said TV flyback pulse simulating circuit to connect with an input terminal of said PIF, SIF color decoder and horizontal and vertical deflection circuit, wherein a first way of said bistable multivibrator integrated circuit N3 has been designed into descent edge trigger, said pulse width TW1 being regulated by said first potentiometer VR1, and that a second way of said bistable multivibrator integrated circuit N3 has also been designed into descent edge trigger, said pulse width TW2 being regulated by said second potentiometer VR2, and that in comparison with said pin 1, said climbing edge has obviously been advanced and said pulse width has been widened in terms of said pulse of said pin 5.

24. A multi-functional monitor, as recited in claim 19, wherein said TV flyback pulse simulating circuit comprises a bistable multivibrator integrated circuit (IC) N3, a first and a second resistor R2 and R3, a first and a second potentiometer VR1 and VR2, and a first and a second capacitor C1 and C2, pins 14 and 15 of said bistable multivibrator integrated circuit N3 which have joined in parallel up with said first capacitor C1, said first potentiometer VR1 and said first resistor R2 being connected in series in between said pins 15 and 16 of said bistable multivibrator integrated circuit N3, while pins 10, 11, 16, 2 and 3 of said bistable multivibrator integrated circuit N3 are connected with said power supply, pin 6 and pin 7 of said bistable multivibrator integrated circuit N3 being connected in parallel with said second capacitor C2 and pins 3 and 6 being connected with said second potentiometer VR2 and said second resistor R3 which are joined in series together, pin 1 of said bistable multivibrator integrated circuit N3 serving as a signal input terminal of said TV flyback pulse simulating circuit and connecting with a signal output terminal of said fly back transformer (FBT) which works in computer VGA mode, pin 12 of said bistable multivibrator integrated circuit N3 serving as a signal output terminal of said TV flyback pulse simulating circuit to connect with an input terminal of said PIF, SIF color decoder and horizontal and vertical deflection circuit, wherein a first way of said bistable multivibrator integrated circuit N3 has been designed into descent edge trigger, said pulse width TW1 being regulated by said first potentiometer VR1, and that a second way of said bistable multivibrator integrated circuit N3 has also been designed into descent edge trigger, said pulse width TW2 being regulated by said second potentiometer VR2, and that in comparison with said pin 1, said climbing edge has obviously been advanced and said pulse width has been widened in terms of said pulse of said pin 5.

25. A multi-functional monitor, as recited in claim 20, wherein said TV flyback pulse simulating circuit comprises a bistable multivibrator integrated circuit (IC) N3, a first and a second resistor R2 and R3, a first and a second potentiometer VR1 and VR2, and a first and a second capacitor C1 and C2, pins 14 and 15 of said bistable multivibrator integrated circuit N3 which have joined in parallel up with said first capacitor C1, said first potentiometer VR1 and said first resistor R2 being connected in series in between said pins 15 and 16 of said bistable multivibrator integrated circuit N3, while pins 10, 11, 16, 2 and 3 of said bistable multivibrator integrated circuit N3 are connected with a power supply, pin 6 and pin 7 of said bistable multivibrator integrated circuit N3 being connected in parallel with said second capacitor C2 and pins 3 and 6 being connected with said second potentiometer VR2 and said second resistor R3 which are joined in series together, pin 1 of said bistable multivibrator integrated circuit N3 serving as a signal input terminal of said TV flyback pulse simulating circuit and connecting with a signal output terminal of said fly back transformer (FBT) which works in computer VGA mode, pin 12 of said bistable multivibrator integrated circuit N3 serving as a signal output terminal of said TV flyback pulse simulating circuit to connect with an input terminal of said PIF, SIF color decoder and horizontal and vertical deflection circuit, wherein a first way of said bistable multivibrator integrated circuit N3 has been designed into descent edge trigger, said pulse width TW1 being regulated by said first potentiometer VR1, and that a second way of said bistable multivibrator integrated circuit N3 has also been designed into descent edge trigger, said pulse width TW2 being regulated by said second potentiometer VR2, and that in comparison with said pin 1, said climbing edge has obviously been advanced and said pulse width has been widened in terms of said pulse of said pin 5.

26. A multi-functional monitor, as recited in claim 21, wherein said TV flyback pulse simulating circuit comprises a bistable multivibrator integrated circuit (IC) N3, a first and a second resistor R2 and R3, a first and a second potentiometer VR1 and VR2, and a first and a second capacitor C1 and C2, pins 14 and 15 of said bistable multivibrator integrated circuit N3 which have joined in parallel up with said first capacitor C1, said first potentiometer VR1 and said first resistor R2 being connected in series in between said pins 15 and 16 of said bistable multivibrator integrated circuit N3, while pins 10, 11, 16, 2 and 3 of said bistable multivibrator integrated circuit N3 are connected with said power supply, pin 6 and pin 7 of said bistable multivibrator integrated circuit N3 being connected in parallel with said second capacitor C2 and pins 3 and 6 being connected with said second potentiometer VR2 and said second resistor R3 which are joined in series together, pin 1 of said bistable multivibrator integrated circuit N3 serving as a signal input terminal of said TV flyback pulse simulating circuit and connecting with a signal output terminal of said fly back transformer (FBT) which works in computer VGA mode, pin 12 of said bistable multivibrator integrated circuit N3 serving as a signal output terminal of said TV flyback pulse simulating circuit to connect with an input terminal of said PIF, SIF color decoder and horizontal and vertical deflection circuit, wherein a first way of said bistable multivibrator integrated circuit N3 has been designed into descent edge trigger, said pulse width TW1 being regulated by said first potentiometer VR1, and that a second way of said bistable multivibrator integrated circuit N3 has also been designed into descent edge trigger, said pulse width TW2 being regulated by said second potentiometer VR2, and that in comparison with said pin 1, said climbing edge has obviously been advanced and said pulse width has been widened in terms of said pulse of said pin 5.

27. A multi-functional monitor, as recited in claim 22, wherein said TV flyback pulse simulating circuit comprises a bistable multivibrator integrated circuit (IC) N3, a first and a second resistor R2 and R3, a first and a second potentiometer VR1 and VR2, and a first and a second capacitor C1 and C2, pins 14 and 15 of said bistable multivibrator integrated circuit N3 which have joined in parallel up with said first capacitor C1, said first potentiometer VR1 and said first resistor R2 being connected in series in between said pins 15 and 16 of said bistable multivibrator integrated circuit N3, while pins 10, 11, 16, 2 and 3 of said bistable multivibrator integrated circuit N3 are connected with said power supply, pin 6 and pin 7 of said bistable multivibrator integrated circuit N3 being connected in parallel with said second capacitor C2 and pins 3 and 6 being connected with said second potentiometer VR2 and said second resistor R3 which are joined in series together, pin 1 of said bistable multivibrator integrated circuit N3 serving as a signal input terminal of said TV flyback pulse simulating circuit and connecting with a signal output terminal of said fly back transformer (FBT) which works in computer VGA mode, pin 12 of said bistable multivibrator integrated circuit N3 serving as a signal output terminal of said TV flyback pulse simulating circuit to connect with an input terminal of said PIF, SIF color decoder and horizontal and vertical deflection circuit, wherein a first way of said bistable multivibrator integrated circuit N3 has been designed into descent edge trigger, said pulse width TW1 being regulated by said first potentiometer VR1, and that a second way of said bistable multivibrator integrated circuit N3 has also been designed into descent edge trigger, said pulse width TW2 being regulated by said second potentiometer VR2, and that in comparison with said pin 1, said climbing edge has obviously been advanced and said pulse width has been widened in terms of said pulse of said pin 5.

28. A multi-functional monitor, as recited in claim 1, wherein said integrated control circuit comprises a transistor Q1, three resistors R5, R6 and R7 and two diodes D1 and D2, a base lead of said transistor Q1 being connected in series with said diode D2 and said resistor R6 to form an AV input terminal of said integrated control circuit for connecting with one of said outputs of a switching multi controller unit for TV mode remote control and AV switching, said resistor R5 and said diode D1 being bridging connected between said AV input terminal and said resistor R6, one end of said resistor R5 connecting to a power supply, another end of said diode D1 serving as another input terminal of said flyback pulse simulating circuit for connecting with a signal input terminal of said multi controller unit, an emitter of said transistor Q1 being grounded and a controller of said transistor Q1 being divided into two ways, wherein one of which is connected through said resistor R7 with said power supply, and another way which serves as an output terminal of said integrated control circuit for connecting with one of said inputs of said AV switching circuit, wherein when said multi-functional monitor is operating in a computer display mode, said VGA=0V, said transistor Q1 is cut off, wherein no matter what sort of power level AV outputs, it is to be clamped at 0.7V if said output is located at high power level, therefore V0≈12V, and that when said system is operating in a television display mode, VGA≈12V and diode D1 is cut off in an opposite direction, at this moment said AV output being high power level which is to saturate and break over said transistor Q1, and V0≈0.3V, said low power level of said AV output shutting off said transistor Q1, then V0≈12V that said V0 keeps said AV switching circuit under control.

29. A multi-functional monitor, as recited in claim 24, wherein said integrated control circuit comprises a transistor Q1, three resistors R5, R6 and R7 and two diodes D1 and D2, a base lead of said transistor Q1 being connected in series with said diode D2 and said resistor R6 to form an AV input terminal of said integrated control circuit for connecting with one of said outputs of a switching multi controller unit for TV mode remote control and AV switching, said resistor R5 and said diode D1 being bridging connected between said AV input terminal and said resistor R6, one end of said resistor R5 connecting to a power supply, another end of said diode D1 serving as another input terminal of said flyback pulse simulating circuit for connecting with a signal input terminal of said multi controller unit, an emitter of said transistor Q1 being grounded and a controller of said transistor Q1 being divided into two ways, wherein one of which is connected through said resistor R7 with said power supply, and another way which serves as an output terminal of said integrated control circuit for connecting with one of said inputs of said AV switching circuit, wherein when said multi-functional monitor is operating in a computer display mode, said VGA=0V, said transistor Q1 is cut off, wherein no matter what sort of power level AV outputs, it is to be clamped at 0.7V if said output is located at high power level, therefore V0≈12V, and that when said system is operating in a television display mode, VGA≈12V and diode D1 is cut off in an opposite direction, at this moment said AV output being high power level which is to saturate and break over said transistor Q1, and V0≈0.3V, said low power level of said AV output shutting off said transistor Q1, then V0≈12V that said V0 keeps said AV switching circuit under control.

30. A multi-functional monitor, as recited in claim 25, wherein said integrated control circuit comprises a transistor Q1, three resistors R5, R6 and R7 and two diodes D1 and D2, a base lead of said transistor Q1 being connected in series with said diode D2 and said resistor R6 to form an AV input terminal of said integrated control circuit for connecting with one of said outputs of said switching multi controller unit for TV mode remote control and AV switching, said resistor R5 and said diode D1 being bridging connected between said AV input terminal and said resistor R6, one end of said resistor R5 connecting to said power supply, another end of said diode D1 serving as another input terminal of said flyback pulse simulating circuit for connecting with a signal input terminal of said multi controller unit, an emitter of said transistor Q1 being grounded and a controller of said transistor Q1 being divided into two ways, wherein one of which is connected through said resistor R7 with said power supply, and another way which serves as an output terminal of said integrated control circuit for connecting with one of said inputs of said AV switching circuit, wherein when said multi-functional monitor is operating in said computer display mode, said VGA=0V, said transistor Q1 is cut off, wherein no matter what sort of power level AV outputs, it is to be clamped at 0.7V if said output is located at high power level, therefore V0≈12V, and that when said system is operating in said television display mode, VGA≈12V and diode D1 is cut off in an opposite direction, at this moment said AV output being high power level which is to saturate and break over said transistor Q1, and V0≈0.3V, said low power level of said AV output shutting off said transistor Q1, then V0≈12V that said V0 keeps said AV switching circuit under control.

31. A multi-functional monitor, as recited in claim 26, wherein said integrated control circuit comprises a transistor Q1, three resistors R5, R6 and R7 and two diodes D1 and D2, a base lead of said transistor Q1 being connected in series with said diode D2 and said resistor R6 to form an AV input terminal of said integrated control circuit for connecting with one of said outputs of said switching multi controller unit for TV mode remote control and AV switching, said resistor R5 and said diode D1 being bridging connected between said AV input terminal and said resistor R6, one end of said resistor R5 connecting to said power supply, another end of said diode D1 serving as another input terminal of said flyback pulse simulating circuit for connecting with a signal input terminal of said multi controller unit, an emitter of said transistor Q1 being grounded and a controller of said transistor Q1 being divided into two ways, wherein one of which is connected through said resistor R7 with said power supply, and another way which serves as an output terminal of said integrated control circuit for connecting with one of said inputs of said AV switching circuit, wherein when said multi-functional monitor is operating in said computer display mode, said VGA=0V, said transistor Q1 is cut off, wherein no matter what sort of power level AV outputs, it is to be clamped at 0.7V if said output is located at high power level, therefore V0≈12V, and that when said system is operating in said television display mode, VGA≈12V and diode D1 is cut off in an opposite direction, at this moment said AV output being high power level which is to saturate and break over said transistor Q1, and V0≈0.3V, said low power level of said AV output shutting off said transistor Q1, then V0≈12V that said V0 keeps said AV switching circuit under control.

32. A multi-functional monitor, as recited in claim 27, wherein said integrated control circuit comprises a transistor Q1, three resistors R5, R6 and R7 and two diodes D1 and D2, a base lead of said transistor Q1 being connected in series with said diode D2 and said resistor R6 to form an AV input terminal of said integrated control circuit for connecting with one of said outputs of said switching multi controller unit for TV mode remote control and AV switching, said resistor R5 and said diode D1 being bridging connected between said AV input terminal and said resistor R6, one end of said resistor R5 connecting to said power supply, another end of said diode D1 serving as another input terminal of said flyback pulse simulating circuit for connecting with a signal input terminal of said multi controller unit, an emitter of said transistor Q1 being grounded and a controller of said transistor Q1 being divided into two ways, wherein one of which is connected through said resistor R7 with said power supply, and another way which serves as an output terminal of said integrated control circuit for connecting with one of said inputs of said AV switching circuit, wherein when said multi-functional monitor is operating in said computer display mode, said VGA=0V, said transistor Q1 is cut off, wherein no matter what sort of power level AV outputs, it is to be clamped at 0.7V if said output is located at high power level, therefore V0≈12V, and that when said system is operating in said television display mode, VGA≈12V and diode D1 is cut off in an opposite direction, at this moment said AV output being high power level which is to saturate and break over said transistor Q1, and V0≈0.3V, said low power level of said AV output shutting off said transistor Q1, then V0≈12V that said V0 keeps said AV switching circuit under control.

33. A multi-functional monitor, as recited in claim 1, wherein said micro controller unit comprises a SCP chip, fifteen resistors R8 to R20, R23, R24, seven capacitors C3 to C9, a crystal Y1, seven diodes D3 to D9, and three transistors Q2 to Q4, pins 19 and 20 of said SCP chip form a principle oscillating circuit, said resistor R9 and said crystal Y1 which are connected in parallel being coupled with in between said pins 19 and 20 and being grounded respectively through said capacitors C3 and C4, pin 21 of said SCP chip being grounded via said capacitor C7 and being connected with a 5V power supply via said resistor R8 and said diode D3, wherein in the instance of power on and increasing of electricity, said pin 21 is to remain in low power level for a while before it is converted into a high power level because a power voltage of said capacitor C7 does not jump up immediately, therefore a resetting procedure is finished, pin 22 of said SCP chip serving as a testing end and being grounded in normal operation, pin 11 of said SCP chip being designed as an external interrupter by means of a software, pins 2–10, 12–17 and 23–28 being served as I/O terminals, wherein said pins 8 and 9 are externally and respectively connected with two soft-touch switches S101 and S102 to serve as keyboards of said multi-functional monitor, whereby when said soft-touch switches S101 and S102 are pressed down, said SCP chip effectively processes various programs, wherein said soft-touch switch S101 serves switching from a computer display mode to a television display mode and said soft-touch switch S102 serves a television receiving switch, so that simultaneously pressing down both said soft-touch switches S101 and S102 results in a switching of said TV receiving mode from an automatic way to a manual way, and that when said pins 2, 3, 4, 5 are high in power level, illuminating diodes D4, D5, D6, D7 die out, and light on vis-à-vis, said diode D4 indicating that a control of said TV receiving mode is in said automatic way or in said manual way, said diode D5 indicating that said multi-functional monitor is working in said computer display mode or said television display mode, said diode D6 indicating that said TV receiving mode is working in a PAL mode or in a NTSC mode, said diode D7 indicating whether it is PAL-DK and PAL-I in said PAL mode, said pins 6 and 7 in said receiving mode being respectively defined as a PALD and a PALI output terminal and being respectively connected with said transistors Q3 and Q4, of which inverting outputs which is serving as said collectors of said transistors Q3 and Q4 being respectively defined as a PAL-DK and a PAL-I output terminal for connecting with an input terminal of a multi system color receiver, and meanwhile said transistors Q3 and Q4 are respectively connected with said PAL/NTSC terminal via said diode D8, said resistor R23, said diode D9, and said resistor R24, and that when said PAL/NTSC terminal is high in power level, said transistors Q3 and Q4 are forced to saturate and break over, so that said PAL-DK and said PAL-I are low in power level no matter what kind of power level output by said pins 6 and 7 of said SCP chip, and that when said PAL/NTSC terminal is low in power level, it is not able to make any influence on said transistors Q3 and Q4 because said diodes D8 and D9 have been ceased.

34. A multi-functional monitor, as recited in claim 33, wherein said pin 12 of said SCP chip is connected, via said resistor R18, with said transistor Q2 which output is defined as VGA serving as a collector of said transistor Q2, said collector of said transistor Q2 serving as an output terminal connecting to said inputs of said switcher A, said switcher B and said integrated control circuit, said pin 8 of said SCP chip which serves as a selecting output of said television receiving mode being defined as PNin, so that during said television mode and receiving said PAL mode, said pin 8 outputs high power level, and that during receiving said NTSC mode, said pin 8 outputs low power level, moreover said pin 8 is connected with an input terminal of said switching MCU 12, said pins 17, 25–28 being utilized in a horizontal width and geometric distortion of said control circuit, said pins 13, 14 and 16 serving as a selector of said power supply voltage and controlling horizontal and vertical free oscillation frequency of said control circuit, said pin 18 of said SCP chip which serves as a power supplying end is connected with said +5V power supply and is decoupled through said grounded capacitors C5 and C6, said pin 1 being a grounding end of said SCP chip, said pins 23 and 11 being linked with said horizontal and vertical sync signals, wherein said SCP chip controls different display modes according to said frequency and said polarity of said horizontal and vertical sync signals, said pin 24 of said SCP chip which serves as an input of MOSC being connected with said driving and amplifying circuit for cutting off said horizontal driving pulse during switching said display mode, so as to terminate a concern of said horizontal output and remain in low power level for three seconds before converting into a high power level in order to avoid a production of an over-high voltage of said CRT display tube which is a second B-plus during said process of switching, whereby through a program which is consolidated in said SCP chip, said multi controller unit can manage and control said switcher A, said switcher B, said TV signal processing circuit, said integrated control circuit, and said H/V deflection circuit, so as to enable said multi-functional monitor to judge automatically said frequency and polarity of said input signals and to achieve said accurate option of said PAL mode or said NTSC mode as well as said VGA mode thereof.

35. A multi-functional monitor, as recited in claim 29, wherein said micro controller unit comprises a SCP chip, fifteen resistors R8 to R20, R23, R24, seven capacitors C3 to C9, a crystal Y1, seven diodes D3 to D9, and three transistors Q2 to Q4, pins 19 and 20 of said SCP chip form a principle oscillating circuit, said resistor R9 and said crystal Y1 which are connected in parallel being coupled with in between said pins 19 and 20 and being grounded respectively through said capacitors C3 and C4, pin 21 of said SCP chip being grounded via said capacitor C7 and being connected with said power supply via said resistor R8 and said diode D3, wherein in the instance of power on and increasing of electricity, said pin 21 is to remain in low power level for a while before it is converted into a high power level because a power voltage of said capacitor C7 does not jump up immediately, therefore a resetting procedure is finished, pin 22 of said SCP chip serving as a testing end and being grounded in normal operation, pin 11 of said SCP chip being designed as an external interrupter by means of a software, pins 2–10, 12–17 and 23–28 being served as I/O terminals, wherein said pins 8 and 9 are externally and respectively connected with two soft-touch switches S101 and S102 to serve as keyboards of said multi-functional monitor, whereby when said soft-touch switches S101 and S102 are pressed down, said SCP chip effectively processes various programs, wherein said soft-touch switch S101 serves switching from said computer display mode to said television display mode and said soft-touch switch S102 serves a television receiving switch, so that simultaneously pressing down both said soft-touch switches S101 and S102 results in a switching of said TV receiving mode from an automatic way to a manual way, and that when said pins 2, 3, 4, 5 are high in power level, illuminating diodes D4, D5, D6, D7 die out, and light on vis-à-vis, said diode D4 indicating that a control of said TV receiving mode is in said automatic way or in said manual way, said diode D5 indicating that said multi-functional monitor is working in said computer display mode or said television display mode, said diode D6 indicating that said TV receiving mode is working in a PAL mode or in a NTSC mode, said diode D7 indicating whether it is PAL-DK and PAL-I in said PAL mode, said pins 6 and 7 in said receiving mode being respectively defined as a PALD and a PALI output terminal and being respectively connected with said transistors Q3 and Q4, of which inverting outputs which is serving as said collectors of said transistors Q3 and Q4 being respectively defined as a PAL-DK and a PAL-I output terminal for connecting with an input terminal of a multi system color receiver, and meanwhile said transistors Q3 and Q4 are respectively connected with said PAL/NTSC terminal via said diode D8, said resistor R23, said diode D9, and said resistor R24, and that when said PAL/NTSC terminal is high in power level, said transistors Q3 and Q4 are forced to saturate and break over, so that said PAL-DK and said PAL-I are low in power level no matter what kind of power level output by said pins 6 and 7 of said SCP chip, and that when said PAL/NTSC terminal is low in power level, it is not able to make any influence on said transistors Q3 and Q4 because said diodes D8 and D9 have been ceased.

36. A multi-functional monitor, as recited in claim 35, wherein said pin 12 of said SCP chip is connected, via said resistor R18, with said transistor Q2 which output is defined as VGA serving as a collector of said transistor Q2, said collector of said transistor Q2 serving as an output terminal connecting to said inputs of said switcher A, said switcher B and said integrated control circuit, said pin 8 of said SCP chip which serves as a selecting output of said television receiving mode being defined as PNin, so that during said television mode and receiving said PAL mode, said pin 8 outputs high power level, and that during receiving said NTSC mode, said pin 8 outputs low power level, moreover said pin 8 is connected with an input terminal of said switching MCU 12, said pins 17, 25–28 being utilized in a horizontal width and geometric distortion of said control circuit, said pins 13, 14 and 16 serving as a selector of said power supply voltage and controlling horizontal and vertical free oscillation frequency of said control circuit, said pin 18 of said SCP chip which serves as a power supplying end is connected with said +5V power supply and is decoupled through said grounded capacitors C5 and C6, said pin 1 being a grounding end of said SCP chip, said pins 23 and 11 being linked with said horizontal and vertical sync signals, wherein said SCP chip controls different display modes according to said frequency and said polarity of said horizontal and vertical sync signals, said pin 24 of said SCP chip which serves as an input of MOSC being connected with said driving and amplifying circuit for cutting off said horizontal driving pulse during switching said display mode, so as to terminate a concern of said horizontal output and remain in low power level for three seconds before converting into a high power level in order to avoid a production of an over-high voltage of said CRT display tube which is a second B-plus during said process of switching, whereby through a program which is consolidated in said SCP chip, said multi controller unit can manage and control said switcher A, said switcher B, said TV signal processing circuit, said integrated control circuit, and said H/V deflection circuit, so as to enable said multi-functional monitor to judge automatically said frequency and polarity of said input signals and to achieve said accurate option of said PAL mode or said NTSC mode as well as said VGA mode thereof.

37. A multi-functional monitor, as recited in claim 30, wherein said micro controller unit comprises a SCP chip, fifteen resistors R8 to R20, R23, R24, seven capacitors C3 to C9, a crystal Y1, seven diodes D3 to D9, and three transistors Q2 to Q4, pins 19 and 20 of said SCP chip form a principle oscillating circuit, said resistor R9 and said crystal Y1 which are connected in parallel being coupled with in between said pins 19 and 20 and being grounded respectively through said capacitors C3 and C4, pin 21 of said SCP chip being grounded via said capacitor C7 and being connected with said power supply via said resistor R8 and said diode D3, wherein in the instance of power on and increasing of electricity, said pin 21 is to remain in low power level for a while before it is converted into a high power level because a power voltage of said capacitor C7 does not jump up immediately, therefore a resetting procedure is finished, pin 22 of said SCP chip serving as a testing end and being grounded in normal operation, pin 11 of said SCP chip being designed as an external interrupter by means of a software, pins 2–10, 12–17 and 23–28 being served as I/O terminals, wherein said pins 8 and 9 are externally and respectively connected with two soft-touch switches S101 and S102 to serve as keyboards of said multi-functional monitor, whereby when said soft-touch switches S101 and S102 are pressed down, said SCP chip effectively processes various programs, wherein said soft-touch switch S101 serves switching from said computer display mode to said television display mode and said soft-touch switch S102 serves a television receiving switch, so that simultaneously pressing down both said soft-touch switches S101 and S102 results in a switching of said TV receiving mode from an automatic way to a manual way, and that when said pins 2, 3, 4, 5 are high in power level, illuminating diodes D4, D5, D6, D7 die out, and light on vis-à-vis, said diode D4 indicating that a control of said TV receiving mode is in said automatic way or in said manual way, said diode D5 indicating that said multi-functional monitor is working in said computer display mode or said television display mode, said diode D6 indicating that said TV receiving mode is working in a PAL mode or in a NTSC mode, said diode D7 indicating whether it is PAL-DK and PAL-I in said PAL mode, said pins 6 and 7 in said receiving mode being respectively defined as a PALD and a PALI output terminal and being respectively connected with said transistors Q3 and Q4, of which inverting outputs which is serving as said collectors of said transistors Q3 and Q4 being respectively defined as a PAL-DK and a PAL-I output terminal for connecting with an input terminal of a multi system color receiver, and meanwhile said transistors Q3 and Q4 are respectively connected with said PAL/NTSC terminal via said diode D8, said resistor R23, said diode D9, and said resistor R24, and that when said PAL/NTSC terminal is high in power level, said transistors Q3 and Q4 are forced to saturate and break over, so that said PAL-DK and said PAL-I are low in power level no matter what kind of power level output by said pins 6 and 7 of said SCP chip, and that when said PAL/NTSC terminal is low in power level, it is not able to make any influence on said transistors Q3 and Q4 because said diodes D8 and D9 have been ceased.

38. A multi-functional monitor, as recited in claim 37, wherein said pin 12 of said SCP chip is connected, via said resistor R18, with said transistor Q2 which output is defined as VGA serving as a collector of said transistor Q2, said collector of said transistor Q2 serving as an output terminal connecting to said inputs of said switcher A, said switcher B and said integrated control circuit, said pin 8 of said SCP chip which serves as a selecting output of said television receiving mode being defined as PNin, so that during said television mode and receiving said PAL mode, said pin 8 outputs high power level, and that during receiving said NTSC mode, said pin 8 outputs low power level, moreover said pin 8 is connected with an input terminal of said switching MCU 12, said pins 17, 25–28 being utilized in a horizontal width and geometric distortion of said control circuit, said pins 13, 14 and 16 serving as a selector of said power supply voltage and controlling horizontal and vertical free oscillation frequency of said control circuit, said pin 18 of said SCP chip which serves as a power supplying end is connected with said +5V power supply and is decoupled through said grounded capacitors C5 and C6, said pin 1 being a grounding end of said SCP chip, said pins 23 and 11 being linked with said horizontal and vertical sync signals, wherein said SCP chip controls different display modes according to said frequency and said polarity of said horizontal and vertical sync signals, said pin 24 of said SCP chip which serves as an input of MOSC being connected with said driving and amplifying circuit for cutting off said horizontal driving pulse during switching said display mode, so as to terminate a concern of said horizontal output and remain in low power level for three seconds before converting into a high power level in order to avoid a production of an over-high voltage of said CRT display tube which is a second B-plus during said process of switching, whereby through a program which is consolidated in said SCP chip, said multi controller unit can manage and control said switcher A, said switcher B, said TV signal processing circuit, said integrated control circuit, and said H/V deflection circuit, so as to enable said multi-functional monitor to judge automatically said frequency and polarity of said input signals and to achieve said accurate option of said PAL mode or said NTSC mode as well as said VGA mode thereof.

39. A multi-functional monitor, as recited in claim 31, wherein said micro controller unit comprises a SCP chip, fifteen resistors R8 to R20, R23, R24, seven capacitors C3 to C9, a crystal Y1, seven diodes D3 to D9, and three transistors Q2 to Q4, pins 19 and 20 of said SCP chip form a principle oscillating circuit, said resistor R9 and said crystal Y1 which are connected in parallel being coupled with in between said pins 19 and 20 and being grounded respectively through said capacitors C3 and C4, pin 21 of said SCP chip being grounded via said capacitor C7 and being connected with said power supply via said resistor R8 and said diode D3, wherein in the instance of power on and increasing of electricity, said pin 21 is to remain in low power level for a while before it is converted into a high power level because a power voltage of said capacitor C7 does not jump up immediately, therefore a resetting procedure is finished, pin 22 of said SCP chip serving as a testing end and being grounded in normal operation, pin 11 of said SCP chip being designed as an external interrupter by means of a software, pins 2–10, 12–17 and 23–28 being served as I/O terminals, wherein said pins 8 and 9 are externally and respectively connected with two soft-touch switches S101 and S102 to serve as keyboards of said multi-functional monitor, whereby when said soft-touch switches S101 and S102 are pressed down, said SCP chip effectively processes various programs, wherein said soft-touch switch S101 serves switching from said computer display mode to said television display mode and said soft-touch switch S102 serves a television receiving switch, so that simultaneously pressing down both said soft-touch switches S101 and S102 results in a switching of said TV receiving mode from an automatic way to a manual way, and that when said pins 2, 3, 4, 5 are high in power level, illuminating diodes D4, D5, D6, D7 die out, and light on vis-à-vis, said diode D4 indicating that a control of said TV receiving mode is in said automatic way or in said manual way, said diode D5 indicating that said multi-functional monitor is working in said computer display mode or said television display mode, said diode D6 indicating that said TV receiving mode is working in a PAL mode or in a NTSC mode, said diode D7 indicating whether it is PAL-DK and PAL-I in said PAL mode, said pins 6 and 7 in said receiving mode being respectively defined as a PALD and a PALI output terminal and being respectively connected with said transistors Q3 and Q4, of which inverting outputs which is serving as said collectors of said transistors Q3 and Q4 being respectively defined as a PAL-DK and a PAL-I output terminal for connecting with an input terminal of a multi system color receiver, and meanwhile said transistors Q3 and Q4 are respectively connected with said PAL/NTSC terminal via said diode D8, said resistor R23, said diode D9, and said resistor R24, and that when said PAL/NTSC terminal is high in power level, said transistors Q3 and Q4 are forced to saturate and break over, so that said PAL-DK and said PAL-I are low in power level no matter what kind of power level output by said pins 6 and 7 of said SCP chip, and that when said PAL/NTSC terminal is low in power level, it is not able to make any influence on said transistors Q3 and Q4 because said diodes D8 and D9 have been ceased.

40. A multi-functional monitor, as recited in claim 39, wherein said pin 12 of said SCP chip is connected, via said resistor R18, with said transistor Q2 which output is defined as VGA serving as a collector of said transistor Q2, said collector of said transistor Q2 serving as an output terminal connecting to said inputs of said switcher A, said switcher B and said integrated control circuit, said pin 8 of said SCP chip which serves as a selecting output of said television receiving mode being defined as PNin, so that during said television mode and receiving said PAL mode, said pin 8 outputs high power level, and that during receiving said NTSC mode, said pin 8 outputs low power level, moreover said pin 8 is connected with an input terminal of said switching MCU 12, said pins 17, 25–28 being utilized in a horizontal width and geometric distortion of said control circuit, said pins 13, 14 and 16 serving as a selector of said power supply voltage and controlling horizontal and vertical free oscillation frequency of said control circuit, said pin 18 of said SCP chip which serves as a power supplying end is connected with said +5V power supply and is decoupled through said grounded capacitors C5 and C6, said pin 1 being a grounding end of said SCP chip, said pins 23 and 11 being linked with said horizontal and vertical sync signals, wherein said SCP chip controls different display modes according to said frequency and said polarity of said horizontal and vertical sync signals, said pin 24 of said SCP chip which serves as an input of MOSC being connected with said driving and amplifying circuit for cutting off said horizontal driving pulse during switching said display mode, so as to terminate a concern of said horizontal output and remain in low power level for three seconds before converting into a high power level in order to avoid a production of an over-high voltage of said CRT display tube which is a second B-plus during said process of switching, whereby through a program which is consolidated in said SCP chip, said multi controller unit can manage and control said switcher A, said switcher B, said TV signal processing circuit, said integrated control circuit, and said H/V deflection circuit, so as to enable said multi-functional monitor to judge automatically said frequency and polarity of said input signals and to achieve said accurate option of said PAL mode or said NTSC mode as well as said VGA mode thereof.

* * * * *